(12) United States Patent
Hellstrom et al.

(10) Patent No.: US 10,324,916 B2
(45) Date of Patent: Jun. 18, 2019

(54) PREDICTIVE SERVICE ACCESS

(75) Inventors: Minna Hellstrom, Tuusula (FI); Mikko Lonnfors, Helsinki (FI); Eki Monni, Espoo (FI); Istvan Beszteri, Espoo (FI); Mikko Terho, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 593 days.

(21) Appl. No.: 14/379,624

(22) PCT Filed: Feb. 22, 2012

(86) PCT No.: PCT/FI2012/050178
§ 371 (c)(1),
(2), (4) Date: Dec. 2, 2014

(87) PCT Pub. No.: WO2013/124519
PCT Pub. Date: Aug. 29, 2013

(65) Prior Publication Data
US 2015/0178337 A1   Jun. 25, 2015

(51) Int. Cl.
| | |
|---|---|
| *G06N 7/02* | (2006.01) |
| *G06N 7/04* | (2006.01) |
| *G06N 7/06* | (2006.01) |
| *G06N 7/08* | (2006.01) |
| *G06F 16/22* | (2019.01) |
| *G06F 16/957* | (2019.01) |
| *G06Q 30/02* | (2012.01) |

(Continued)

(52) U.S. Cl.
CPC ........ *G06F 16/2237* (2019.01); *G06F 16/957* (2019.01); *G06F 16/9535* (2019.01); *G06N 5/00* (2013.01); *G06Q 10/10* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,895,470 | A | 4/1999 | Pirolli et al. |
| 6,334,127 | B1 | 12/2001 | Bieganski et al. |

(Continued)

FOREIGN PATENT DOCUMENTS

| | | |
|---|---|---|
| CN | 101297291 | 10/2008 |
| CN | 101470754 A | 7/2009 |

(Continued)

OTHER PUBLICATIONS

Using Term Co-occurrence Data for Document Indexing and Retrieval—2000 Holger Billhardt (Year: 2000).*

(Continued)

*Primary Examiner* — Scott A. Waldron
*Assistant Examiner* — Ababacar Seck
(74) *Attorney, Agent, or Firm* — Alston & Bird LLP

(57) ABSTRACT

The invention relates to predictive browsing. A set of words for use with an experience matrix are formed, wherein the words are descriptive of a context of a system such as a current web page, and wherein said experience matrix comprises sparse vectors associated with words. At least a part of at least one sparse vector of said experience matrix is accessed to form a prediction output, and suggestions of web pages are provided to a user in response to said prediction output.

20 Claims, 22 Drawing Sheets

(51) Int. Cl.
*G06Q 10/10* (2012.01)
*G06N 5/00* (2006.01)
*G06F 16/9535* (2019.01)

(56) References Cited

U.S. PATENT DOCUMENTS

| | | | |
|---|---|---|---|
| 6,710,787 | B1 | 3/2004 | Eves et al. |
| 7,251,637 | B1* | 7/2007 | Caid ................ G06F 17/30256 706/15 |
| 7,461,058 | B1 | 12/2008 | Rauser et al. |
| 8,516,205 | B2 | 8/2013 | Karkkainen et al. |
| 2002/0019856 | A1 | 2/2002 | Bezos et al. |
| 2008/0209339 | A1 | 8/2008 | Macadaan et al. |
| 2008/0222242 | A1 | 9/2008 | Weiss et al. |
| 2009/0037355 | A1* | 2/2009 | Brave ................ G06F 17/30867 706/45 |
| 2009/0128571 | A1* | 5/2009 | Smith ................ G06F 17/16 345/519 |
| 2009/0172021 | A1 | 7/2009 | Kane et al. |
| 2009/0210806 | A1* | 8/2009 | Dodson ............ G06F 17/30899 715/760 |
| 2009/0299996 | A1* | 12/2009 | Yu .................... G06F 17/30867 |
| 2009/0313227 | A1 | 12/2009 | Dunning et al. |
| 2010/0179933 | A1* | 7/2010 | Bai .................... G06F 17/30616 706/12 |
| 2011/0302099 | A1* | 12/2011 | Jeffries ................ G06Q 10/10 705/319 |
| 2012/0005192 | A1* | 1/2012 | Bao .................... G06F 17/30882 707/721 |
| 2012/0030338 | A1* | 2/2012 | Zhang ................ G06F 11/3419 709/223 |
| 2012/0110267 | A1* | 5/2012 | Karkkainen .......... G06F 9/5061 711/126 |

FOREIGN PATENT DOCUMENTS

| | | |
|---|---|---|
| CN | 101493832 A | 7/2009 |
| JP | H11250091 A | 9/1999 |
| JP | 2003-134220 A | 5/2003 |
| JP | 2007-207217 A | 8/2007 |
| JP | 2009-157764 A | 7/2009 |
| JP | 2010-530567 A | 9/2010 |
| JP | 2011-508925 A | 3/2011 |
| JP | 2011-175362 A | 9/2011 |
| JP | 2011-524576 A | 9/2011 |
| WO | 2008/147126 A1 | 12/2008 |
| WO | 2009/086014 A1 | 7/2009 |
| WO | 2012/123619 A1 | 9/2012 |
| WO | 2012/123621 A1 | 9/2012 |
| WO | WO 2013/124522 | 8/2013 |

OTHER PUBLICATIONS

Extended European Search Report received for corresponding European Patent Application No. 12869102.9, dated Mar. 3, 2016, 8 pages.

Hou, "A Matrix-Based Model for Web Page Community Construction and More", Informatica, vol. 18, No. 2, Apr. 2007, pp. 217-238.

Office action received for corresponding Japanese Patent Application No. 2014-558169, dated Dec. 22, 2015, 4 pages of office action and 5 pages of office action translation available.

Lee et al., "An Adaptive User Interface Based on Spatiotemporal Structure Learning", IEEE Communications Magazine, vol. 49, No. 6, Jun. 2011, pp. 118-124.

Office action received for corresponding Japanese Patent Application No. 2014-558169, dated Aug. 28, 2015, 3 pages of office action and 5 pages of office action translation available.

International Search Report and Written Opinion received for corresponding Patent Cooperation Treaty Application No. PCT/FI2012/050178, dated Dec. 21, 2013, 13 pages.

Office action received for corresponding Chinese Patent Application No. 201280072557.5, dated Jan. 4, 2017, 7 pages of office action and 3 pages of office action translation available.

Office Action and Search Report for Chinese Patent Application No. 201280072557.5 dated Sep. 26, 2017, with English summary, 12 pages.

Office Action for Chinese Application No. 2012800725575, dated Mar. 29, 2018, 6 pages.

* cited by examiner

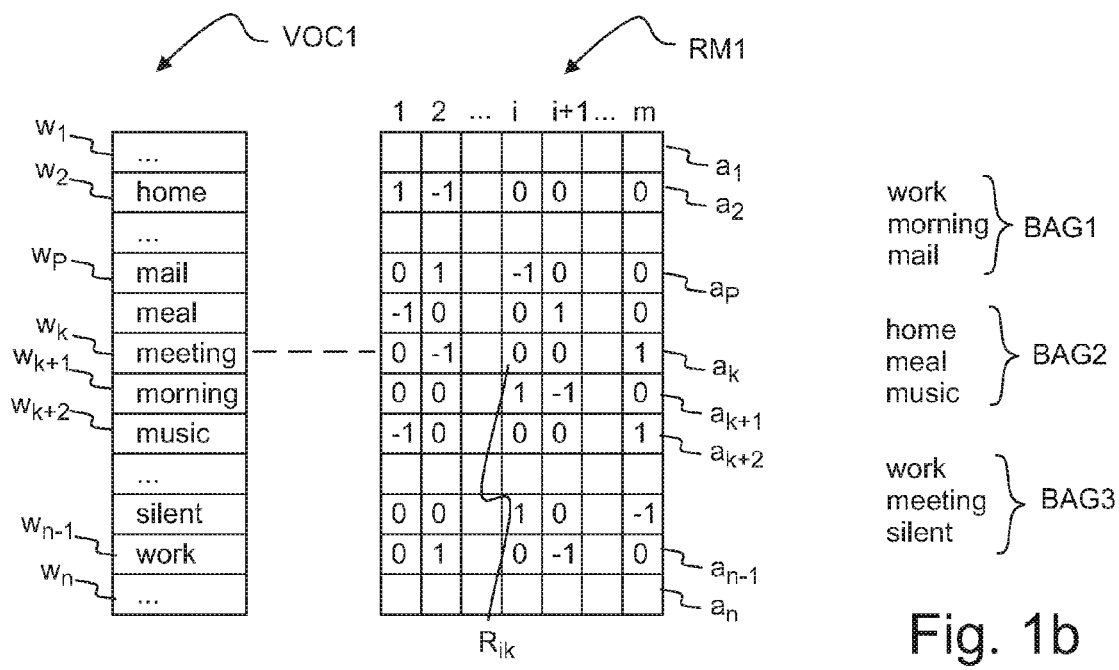
Fig. 1a
Fig. 1b
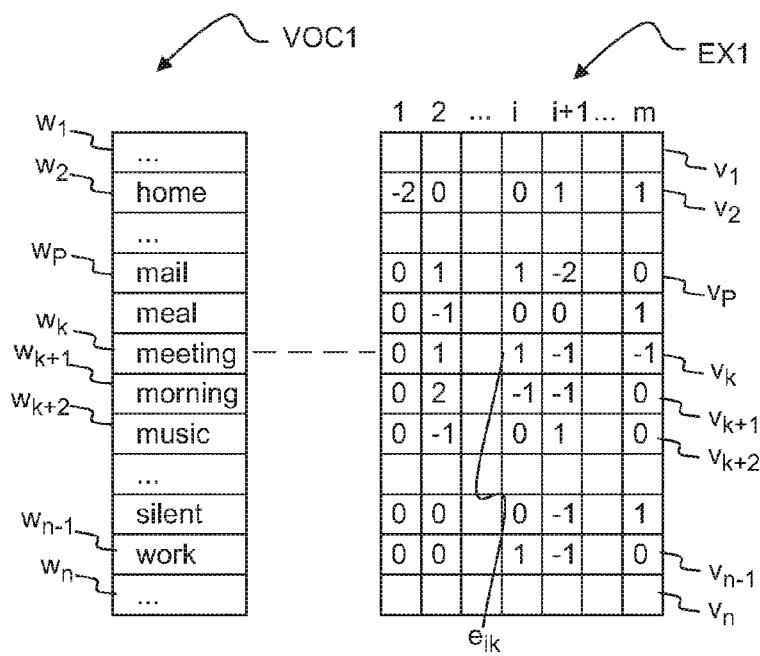
Fig. 1c

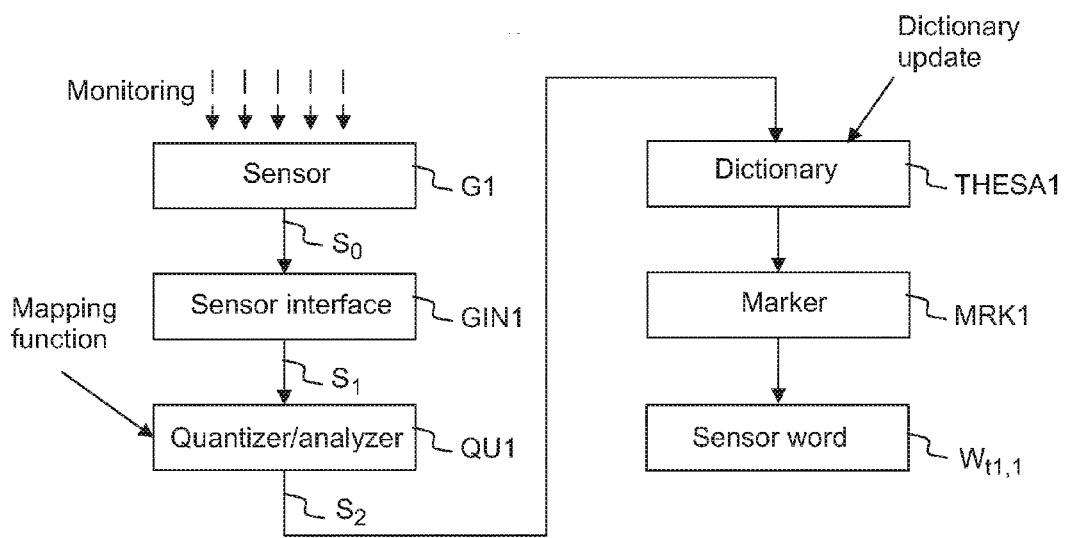
Fig. 7b
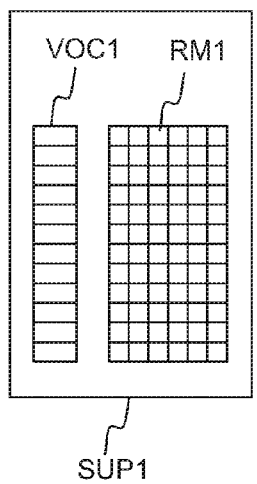 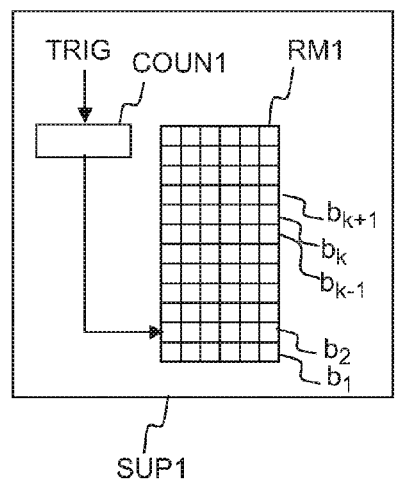 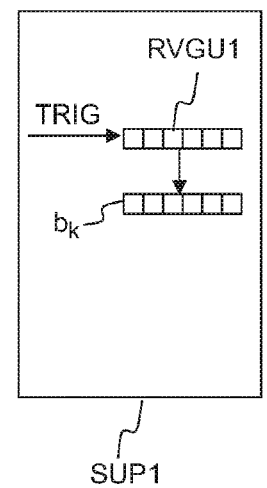
Fig. 7c  Fig. 7d  Fig. 7e

| URL | Country | Name | Keywords |
|---|---|---|---|
| http://op.fi | FI | op.fi | bank, banking, pay bills, e-bank |
| http://www.oikotie.fi/ | FI | Oikotie | house, cottage, sell, buy, rent, apartment |
| http://www.msn.com/ | FI | MSN | hotmail, messenger, video,news, movies,health, cars, spaces, windows live, MSN |
| http://www.imdb.com/ | FI | The Internet Movie Database | video, movie, films, actors, actresses, hollywood, stars, movie facts |
| http://fi.posti.fi/ | FI | Suomen Posti Oy | postal service, postal code |
| http://www.gigantti.fi/ | FI | Gigantti | buy, appliances, computers |
| http://www.afterdawn.se/ | FI | AfterDawn | swedish, Sweden, news, yellow paper |
| http://wordpress.se/ | FI | WordPress | blog,news |
| http://finder.fi/ | FI | Finder.fi | phone number, addresses |
| http://www.hsl.fi/fi/sivut/default.aspx | FI | Helsinki Seutuliikenne | public transport, routes, timetable |
| http://www.dailymail.co.uk/home/index.html | FI | The Daily Mail | news, UK, English |
| http://www.adobe.com/ | FI | Adobe Systems Incorporated | adobe Flash, Adobe Reader, Adobe Air, Adobe Flashware |
| http://www.citydeal.fi/ | FI | citydeal.fi | Deals, Groupon, Halvinken |
| http://stackoverflow.com/ | FI | Stack Overflow | question and answer, professional, coding, programming |
| http://fonecta.fi/ | FI | fonecta.fi | find, phone number |
| http://www.conduit.com/ | FI | conduit.com | custom, apps, build your own, community, social layer |
| http://www.livejournal.com/ | FI | LiveJournal.com | communities, journaling, celebrity gossip, ONTD, entertainment, music |
| http://www.google.co.uk/ | UK | Google UK | search, mail, map |
| http://www.facebook.com/ | UK | facebook | social, group |
| http://google.com | UK | Google.com | search, mail, map |
| http://www.youtube.com/ | UK | YouTube | video, you, sharing, free, download |
| http://www.bbc.co.uk/ | UK | BBC Online | news, search, broadcasting |
| http://www.ebay.co.uk/ | UK | eBay UK | buy,sell,vintage,used,deals |
| http://fi.yahoo.com/ | UK | Yahoo! | search,mail,messenger,games,news,entertainment |
| http://amazon.co.uk/ | UK | Amazon.co.uk | digital camera, LCD TV, books, DVD, low prices, video games, pc games, software |
| http://www.wikipedia.org/ | UK | Wikipedia | encyclopedia, free, dictionary,documentation, anyone |
| http://windowslive.com/ | UK | Windows Live | mail, calendar, messenger, social |
| http://twitter.com/ | UK | Twitter | tweet, social, people, follow, experts,celebrities, news |
| http://www.linkedin.com/ | UK | LinkedIn | exchange, information, business, link, social |
| http://blogspot.com/ | UK | Blogspot.com | share,blog,pictures,video,free,book |
| http://paypal.com/ | UK | PayPal | money,pay |
| http://www.dailymail.co.uk/home/index.html | UK | The Daily Mail | news, sport, showbiz, science and health stories,newspaper |
| http://www.guardian.co.uk/ | UK | The Guardian | news, sport, business, comment, analysis and reviews, liberal |
| http://msn.com | UK | MSN | hotmail, messenger, video,news, movies,health, cars, spaces, windows live, MSN |
| http://www.amazon.com/ | UK | Amazon.com | online,shopping,books,music,subscriptions,CDs,store,DVDs,online shopping, |
| http://wordpress.com/ | UK | WordPress | blog,news,content management |

PREDICTIVE SERVICE ACCESS

RELATED APPLICATION

This application was originally filed as Patent Cooperation Treaty Application No. PCT/FI2012/050178 filed Feb. 22, 2012.

BACKGROUND

Current electronic user devices like smart phones and computers carry a plurality of functionalities, for example various programs for different needs and different modules for positioning, communication and entertainment. The variety of tasks that can be performed with these devices is large, and the individual tasks may be complex in nature. For example, a lot of the work carried out in today's world is done with the help of computers. Likewise, electronic devices have become part of everyday life in free time, as well. In addition, a large number of web services and applications are available through the internet for various purposes.

The user of a modern electronic device like a computer or a smart phone may be overwhelmed by the variety of functions provided by the system and by the variety of services and applications at his/her reach. For this purpose, the devices may provide ways of customizing the looks and the arrangement of functions in the device so that the functions of the device that the user needs are easily reachable. However, the state of the system as well as the situation where it is used may have an effect on the preference and needs of the user.

There is, therefore, a need for solutions for providing easier access to relevant services in the internet for a user of a system.

SUMMARY

Now there has been invented an improved method and technical equipment implementing the method, by which the above problems are alleviated. Various aspects of the invention include a method, an apparatus, a server, a client, a data structure and a computer readable medium comprising a computer program stored therein, which are characterized by what is stated in the independent claims. Various embodiments of the invention are disclosed in the dependent claims.

Example embodiments relate to predictive browsing. A set of words for use with an experience matrix are formed, wherein the words are descriptive of a context of a system such as a current web page, and wherein said experience matrix comprises sparse vectors associated with words. At least a part of at least one sparse vector of said experience matrix is accessed to form a prediction output, and suggestions of web pages are provided to a user in response to said prediction output. Abstraction metadata may be used to form the prediction so that the prediction is based on words descriptive of the site instead of the contents (sometimes accidental, e.g. advertisements).

According to a first aspect there is provided a method, comprising forming a set of words for use with an experience matrix, wherein the words are descriptive of a context of a system such as a current web page, and wherein said experience matrix comprises sparse vectors associated with words, accessing at least a part of at least one sparse vector of said experience matrix to form a prediction output, and providing suggestions of web pages to a user in response to said prediction output.

According to an embodiment, the method comprises forming an input buffer for collecting words for updating said experience matrix. According to an embodiment, the method comprises forming said prediction output based on web browser activity. According to an embodiment, the method comprises forming said prediction output based on a page load completion. According to an embodiment, the method comprises forming said prediction output in the background. According to an embodiment, the method comprises updating said experience matrix based on web browser activity. According to an embodiment, the method comprises forming a prediction list comprising images or text of web pages, and updating said prediction list based on web browser activity. According to an embodiment, the method comprises, as a result of said prediction output, providing suggestions on other related data than web pages. According to an embodiment, the method comprises using abstraction metadata in forming said experience matrix. According to an embodiment, the method comprises using abstraction metadata in forming said prediction. According to an embodiment, said abstraction metadata is country-specific. According to an embodiment, said abstraction metadata is in the form of an experience matrix. According to an embodiment, the method comprises using in a weighted manner site content and said abstraction metadata in forming said prediction.

According to a second aspect there is provided a computer program product including one or more sequences of one or more instructions which, when executed by one or more processors, cause a system to perform the method according to any embodiment of the first aspect.

According to a third aspect there is provided a computer program product including one or more sequences of one or more instructions which, when executed by one or more processors, cause a system to form a set of words for use with an experience matrix, wherein the words are descriptive of a context of a system such as a current web page, and wherein said experience matrix comprises sparse vectors associated with words, access at least a part of at least one sparse vector of said experience matrix to form a prediction output, and provide suggestions of web pages to a user in response to said prediction output.

According to an embodiment, the computer program product comprises one or more sequences of one or more instructions to cause a system to form a prediction list comprising images or text of web pages, and update said prediction list based on web browser activity. According to an embodiment, the computer program product comprises one or more sequences of one or more instructions to cause a system to use abstraction metadata in forming said experience matrix. According to an embodiment, the computer program product comprises one or more sequences of one or more instructions to cause a system to use abstraction metadata in forming said prediction.

According to a fourth aspect there is provided a data structure for controlling the operation of a computer system, said data structure comprising an experience matrix having sparse high-dimensional vectors, said vectors comprising information on co-occurrences of words in at least one system or apparatus, and said experience matrix having been formed at least partially by using abstraction metadata of web sites. According to an embodiment, said abstraction metadata is country-specific.

According to a fifth aspect there is provided an apparatus comprising at least one processor, at least one memory including computer program code for one or more program units, the at least one memory and the computer program code configured to, with the processor, cause the apparatus to form a set of words for use with an experience matrix, wherein the words are descriptive of a context of a system such as a current web page, and wherein said experience matrix comprises sparse vectors associated with words, access at least a part of at least one sparse vector of said experience matrix to form a prediction output, and provide suggestions of web pages to a user in response to said prediction output.

According to an embodiment, the apparatus comprises computer program code configured to cause the apparatus to form an input buffer for collecting words for updating said experience matrix. According to an embodiment, the apparatus comprises computer program code configured to cause the apparatus to form said prediction output based on web browser activity. According to an embodiment, the apparatus comprises computer program code configured to cause the apparatus to form said prediction output based on a page load completion. According to an embodiment, the apparatus comprises computer program code configured to cause the apparatus to form said prediction output in the background. According to an embodiment, the apparatus comprises computer program code configured to cause the apparatus to update said experience matrix based on web browser activity. According to an embodiment, the apparatus comprises computer program code configured to cause the apparatus to form a prediction list comprising images or text of web pages, and update said prediction list based on web browser activity. According to an embodiment, the apparatus comprises computer program code configured to cause the apparatus to as a result of said prediction output, provide suggestions on other related data than web pages. According to an embodiment, the apparatus comprises computer program code configured to cause the apparatus to use abstraction metadata in forming said experience matrix. According to an embodiment, the apparatus comprises computer program code configured to cause the apparatus to use abstraction metadata in forming said prediction. According to an embodiment, said abstraction metadata is country-specific. According to an embodiment, said abstraction metadata is in the form of an experience matrix. According to an embodiment, the apparatus comprises computer program code configured to cause the apparatus to use in a weighted manner site content and said abstraction metadata in forming said prediction.

According to a sixth aspect there is provided an apparatus comprising means for forming a set of words for use with an experience matrix, wherein the words are descriptive of a context of a system such as a current web page, and wherein said experience matrix comprises sparse vectors associated with words, means for accessing at least a part of at least one sparse vector of said experience matrix to form a prediction output, and means for providing suggestions of web pages to a user in response to said prediction output.

According to an embodiment, the apparatus comprises means for forming an input buffer for collecting words for updating said experience matrix. According to an embodiment, the apparatus comprises means for forming said prediction output based on web browser activity. According to an embodiment, the apparatus comprises means for forming said prediction output based on a page load completion. According to an embodiment, the apparatus comprises means for forming said prediction output in the background. According to an embodiment, the apparatus comprises means for updating said experience matrix based on web browser activity. According to an embodiment, the apparatus comprises means for forming a prediction list comprising images or text of web pages, and means for updating said prediction list based on web browser activity. According to an embodiment, the apparatus comprises means for providing suggestions on other related data than web pages as a result of said prediction output. According to an embodiment, the apparatus comprises means for using abstraction metadata in forming said experience matrix. According to an embodiment, the apparatus comprises means for using abstraction metadata in forming said prediction. According to an embodiment, said abstraction metadata is country-specific. According to an embodiment, said abstraction metadata is in the form of an experience matrix. According to an embodiment, the apparatus comprises means for using in a weighted manner site content and said abstraction metadata in forming said prediction.

According to a seventh aspect there is provided a system comprising at least one processor, at least one memory including computer program code for one or more program units, the at least one memory and the computer program code configured to, with the processor, cause the system to form a set of words for use with an experience matrix, wherein the words are descriptive of a context of a system such as a current web page, and wherein said experience matrix comprises sparse vectors associated with words, access at least a part of at least one sparse vector of said experience matrix to form a prediction output, and provide suggestions of web pages to a user in response to said prediction output.

According to an embodiment, the system comprises computer program code configured to cause the system to form an input buffer for collecting words for updating said experience matrix. According to an embodiment, the system comprises computer program code configured to cause the system to form said prediction output based on web browser activity. According to an embodiment, the system comprises computer program code configured to cause the system to form said prediction output based on a page load completion. According to an embodiment, the system comprises computer program code configured to cause the system to form said prediction output in the background. According to an embodiment, the system comprises computer program code configured to cause the system to update said experience matrix based on web browser activity. According to an embodiment, the system comprises computer program code configured to cause the system to form a prediction list comprising images or text of web pages, and update said prediction list based on web browser activity.

According to an embodiment, the system comprises computer program code configured to cause the system to, as a result of said prediction output, provide suggestions on other related data than web pages. According to an embodiment, the system comprises computer program code configured to cause the system to use abstraction metadata in forming said experience matrix. According to an embodiment, the system comprises computer program code configured to cause the system to use abstraction metadata in forming said prediction. According to an embodiment, said abstraction metadata is country-specific. According to an embodiment, said abstraction metadata is in the form of an experience matrix. According to an embodiment, the system comprises computer program code configured to cause the system to use in a weighted manner site content and said abstraction metadata in forming said prediction.

DESCRIPTION OF THE DRAWINGS

In the following, various embodiments of the invention will be described in more detail with reference to the appended drawings of example embodiments, in which FIGS. 1a, 1b and 1c show representing words as basic sparse vectors, bags of words, and an experience matrix after updating with the bags of words, FIG. 7b shows a sensor arranged to provide words as the output, FIG. 7c shows a sparse vector supply comprising a word hash table and a group of basic sparse vectors, FIG. 7d shows a sparse vector supply comprising a group of basic sparse vectors, FIG. 7e shows a sparse vector supply comprising a random number generator configured to generate basic sparse vectors.

FIG. 14 shows an abstraction index for predictive browsing according to an embodiment.

DESCRIPTION OF EXAMPLE EMBODIMENTS

Figure 2:
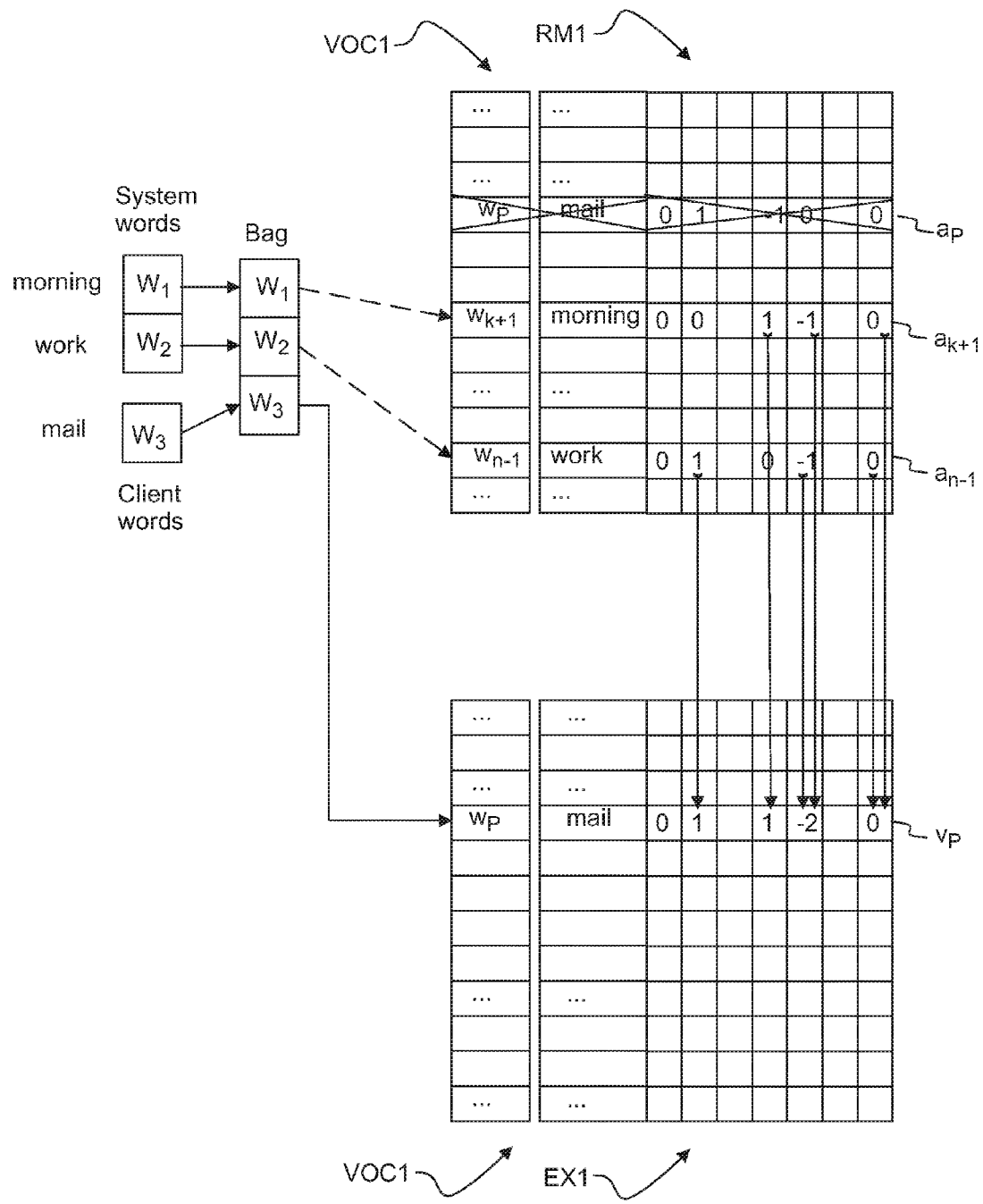
FIG. 2 shows updating an experience matrix by using a bag of words and basic sparse vectors.

In the following, several example embodiments of the invention will be described with reference to contexts of a system as well as a framework of random indexing. It is to be noted, however, that the invention is not limited to these uses or alternatives. In fact, the different embodiments have applications in any environment where semantic processsing and adaptation of the system is required.

Co-occurrence data may be gathered into an experience matrix based on co-occurrences of words in previous situations. The experience matrix may contain historical data about co-occurrences of words in different situations. The experience matrix EX1 may eventually contain a plurality of sparse vectors, which in turn contain information about historical co-occurrences of words related to a system. The matrix EX1 may be interpreted to memorize the experience gathered by one or more systems. The experience matrix may contain the "experience" gathered by one or more systems. The experience matrix may be used e.g. to "predict" suitable actions or operating modes which might be applicable in given situation when one or more (other) words related the situation are known. Thus, the system may change its operation based on observed facts, by using previous experience stored in the experience matrix of the system.

One or more prediction words may be determined from query word or words, by using the data stored in the experience matrix. The system may be subsequently controlled based on the prediction words. The query words may be words, which describe the current situation. The prediction words are words, which are likely to describe the current situation. Co-occurrence data may be stored as vectors of an experience matrix EX1. The co-occurrence data may be subsequently used for making a prediction. A vocabulary VOC1 may be needed to store co-occurrence data in the experience matrix EX1 and to utilize co-occurrence data stored in the experience matrix EX1. In an embodiment, the vocabulary VOC1 may be used also in connection with another matrix, called the basic matrix RM1.

Referring to FIG. 1a, a vocabulary VOC1 may comprise a group of different words $w_1, w_2, \ldots w_n$. The vocabulary VOC1 may be a hash table, which contains pointers to sparse vectors of a basic matrix RM1. The sparse vectors may also be called as random index vectors (RI vectors). Thus, each word $w_1, w_2, \ldots w_n$ of the vocabulary VOC1 may be associated with a basic sparse vector $a_1, a_2, \ldots a_n$. For example, a word $w_k$ (e.g. "meeting") may be associated with a basic sparse vector $a_k$. The basic sparse vectors $a_1, a_2, \ldots a_k, \ldots a_n$ may be stored e.g. as rows of the basic matrix RM1.

The vocabulary VOC1 may be a hash table, which indicates the location (e.g. row k) of the sparse vector in the basic sparse matrix RM1, by using the word (e.g. $w_k$) as the key.

Each basic sparse vector of the matrix RM1 may represent a word. For example, the basic vector $a_k$ may be interpreted to represent the word $w_k$ in sparse vector format. Each basic sparse vector $a_k$ consists of elements $R_{1,k}, R_{2,k}, \ldots, R_{i,k} \ldots, R_{m,k}$. In an embodiment, the basic sparse vectors $a_1, a_2, \ldots a_k, \ldots a_n$ of the matrix RM1 may be unique and different. Each row of the basic matrix RM1 may be a unique basic sparse vector associated with a different word. Each basic sparse vector $a_k$ may have a high number of zero elements and only a few non-zero elements. For example, a basic sparse vector $a_k$ may have e.g. 10000 elements R wherein twenty elements may be non-zero and 9980 elements may be zero.

In an embodiment, the sum of all elements of the basic sparse vector $a_k$ may be equal to zero. This may minimize memory consumption, may simplify mathematical operations and/or may increase data processing speed. In particular, 50% of the non-zero elements may be equal to −1 (minus one), and 50% of the non-zero elements may be equal to 1 (one). In other words, the value of an element may be −1, 0 or 1, and the basic sparse vector $a_k$ may be a ternary vector.

Each vector $a_1, a_2, \ldots a_k, \ldots a_n$ may represented by a point in a multi-dimensional space. More precisely, each vector $a_1, a_2, \ldots a_k, \ldots a_n$ may represented by a different end point in the same multi-dimensional space when the starting point of each vector is located at the same point (e.g. origin). The number m of elements R of the basic sparse vector $a_k$ may be e.g. in the range of 100 to $10^6$. The number $m_{nz}$ of non-zero elements R of the basic sparse vector $a_k$ may be in the range of 0.1% to 10% of the number m, said number $m_{nz}$ of non-zero elements also being in the range of 4 to $10^3$. Increasing the total number m and/or the number $m_{nz}$ of non-zero elements may allow using a larger vocabulary VOC1 and/or may provide more reliable predictions. However, increasing the number m and/or $m_{nz}$ may also require more memory space and more data processing power.

$R_{ik}$ denotes an element of the basic matrix RM1 belonging to the $i^{th}$ column and to the $k^{th}$ row. In an embodiment, the vectors may be ternary and the value of an individual element $e_{ik}$ may be one of the following −1, 0, or 1. The number of negative non-zero elements R may be equal to the number of positive non-zero elements R, the values of the non-zero elements R being integers. This likely to maximize data processing speed, and to minimize the use of memory. However, this is not necessary. For example, a basic sparse vector $a_k$ may have sixteen elements R having a value −0.5 and four elements R having a value 2.

When the vectors $a_1, a_2, \ldots a_k, \ldots a_n$ of the matrix RM1 are compared with each other, the positions of the non-zero elements in a basic sparse vector $a_k$ and the values of the non-zero elements of the basic sparse vector $a_k$ may be randomly distributed. The basic sparse vectors may also be called as random index vectors. This randomness may ensure with a high probability that the points representing the basic sparse vector in the multi-dimensional space are not too close to each other. If two points representing two different words would be too close to each other, this might lead to erroneous predictions during subsequent processing. When the positions and the values are randomly distributed, this may also ensure with a high probability that each word of the vocabulary VOC1 is associated with a unique and different basic sparse vector. When the indices are random, it is highly probable that the elementary sparse vectors associated with two different words are orthogonal or nearly orthogonal. Thus, the dot product of said elementary sparse vectors is equal to zero at a high probability. This pseudo-orthogonality of the words may preserve the unique identity of each word or event or unique occurrence stored in the matrix, even when they are represented by the sparse vectors. This pseudo-orthogonality of the words may preserve the unique identity of each word, event or unique occurrence stored in the experience matrix EX1 when the words, events and/or occurrences are represented as combinations of the sparse vectors in the experience matrix EX1. The words of the vocabulary may be arranged e.g. in alphabetical order.

FIG. 1b shows several sets of words, which may be called e.g. as "bags". A bag comprises two or more different words related to each other. The number of words in a bag may be e.g. in the range of 2 to 1000. Each bag could also be called as a "document".

Figures 4A, 4B:
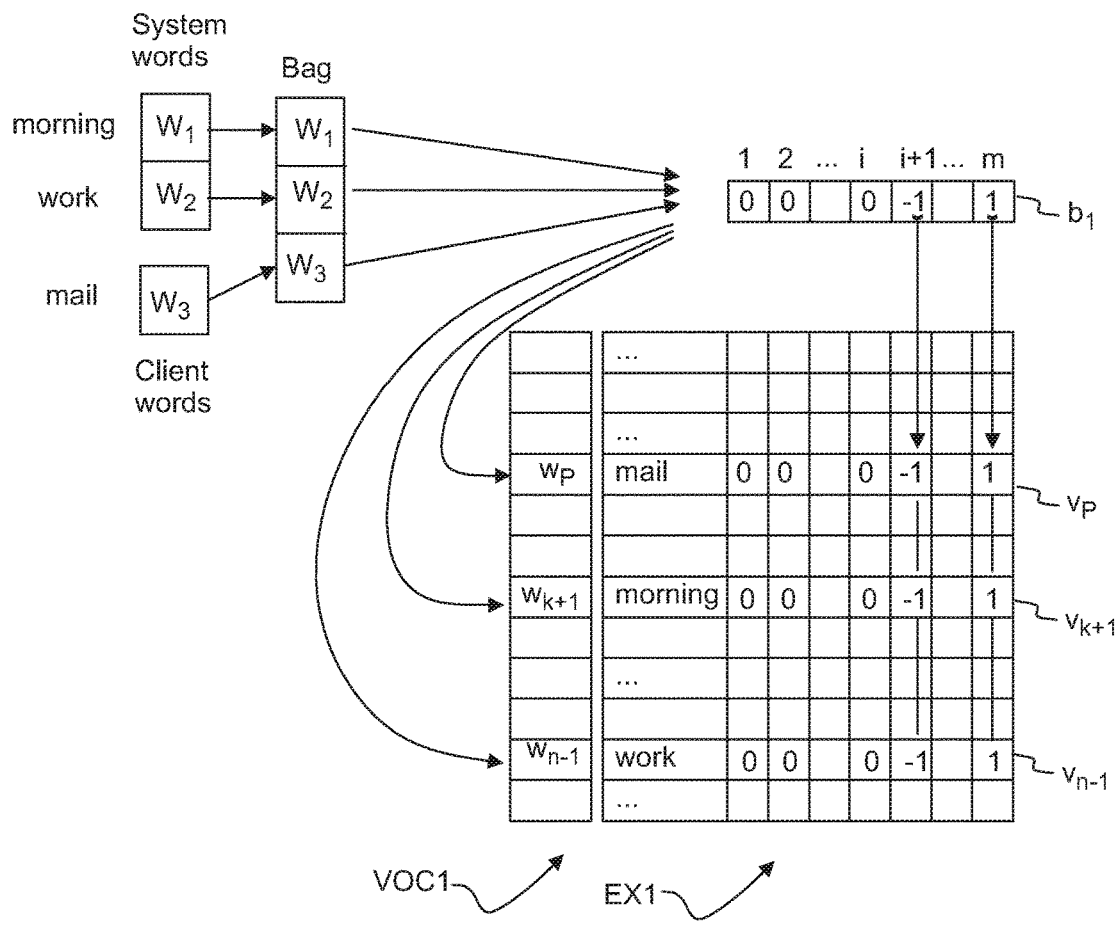
FIGS. 4a, 4b and 4c show representing bags of words as basic sparse vectors, updating an experience matrix by using a bag of words and basic sparse vectors, and an experience matrix after updating.

The bags represent co-occurrences of words. The bags may be used to educate a system. Information about co-occurrences of the words may be stored in a matrix EX1 (FIGS. 1c, 4b).

The words of a bag may e.g. describe a situation and/or a system used in said situation. In particular, the words may represent observed facts.

For example, a first bag BAG1 may comprise the words "work", "morning" and "mail". The word "work" may be e.g. determined e.g. based on a marking in the calendar of the system. The word "morning" may be provided e.g. by a clock of the system. The word "mail" may be related to the words "work" and "morning" e.g. because the system has detected that a user has received and/or sent written messages in a situation described by the words "work" and "morning".

A second bag BAG2 may comprise the words "home", "meal" and "music". The word "home" may be provided e.g. when a navigation unit of carried by a user indicates that the detected location matches with a location called as "home". The word "meal" may be provided e.g. because food (e.g. pizza) has just been ordered to the location "home" via a delivery service. The system may be arranged to provide a word "music" e.g. because user has instructed the system to play music.

The words home, meal and music may represent e.g. a situation prevailing at a first instant $t_1$. The words home, meal and music might be inter-related. If this combination of words has occurred several times in the past, it may e.g. used to evaluate (predict) the likelihood at which the user wishes to listen to music when eating meal at home. For example, a portable device may be arranged to set itself into a music playing mode when it determines that the user is eating meal at home.

A third bag BAG3 may comprise the words "work", "meeting" and "silent". The words "work" and "meeting" may be e.g. determined e.g. based on markings in the calendar of the system. The system may be arranged to provide a status descriptor "work" e.g. based on information contained in a calendar of the user. The system may determine the word "work" also when the location of a portable device of the user matches with the location of the working place. The word "silent" may be derived e.g. because a user attending a meeting has set the system to a silent mode. In particular, the user may have set a mobile phone to an operating mode where the phone does not generate an audible alarm in case of an incoming telephone call.

Now, the words work, meeting and silent may represent a situation prevailing at a second time $t_2$. If this combination of words has occurred several times in the past, it may e.g. used to evaluate (predict) the likelihood at which the user wishes to set his portable to the silent mode when attending a meeting at work. For example, the portable device of the user may now be arranged to automatically suggest setting into a silent mode when it determines that the user is attending a meeting.

Referring to FIG. 1c, data derived from observed co-occurrences of words may be stored as vectors $v_1, v_2, \ldots, v_k \ldots v_n$ of a matrix EX1, which may be called e.g. as an "experience matrix". Each word $w_1, w_2, \ldots w_n$ of the vocabulary VOC1 may (also) be associated with a sparse vector of the experience matrix EX1. The sparse vectors $v_1, v_2, \ldots, v_k \ldots v_n$ may be stored e.g. as rows of the experience matrix EX1.

The vocabulary VOC1 may be the same (hash table) as in FIG. 1a.

Each vector of the experience matrix EX1 may be a linear combination of sparse vectors and an initial vector.

In particular, each vector of the experience matrix EX1 may be a linear combination of the basic sparse vectors of the basic sparse matrix RM1 (FIG. 1a).

The number n of elements $e_{ik}$ of an individual vector $v_k$ may be equal to the number n of elements R of an individual basic sparse vector shown in FIG. 1a. The combining of the sparse vectors may be carried out according to the contents of the bags (FIG. 1b).

The experience matrix EX1 may contain co-occurrence data obtained from a plurality of bags BAG1, BAG2. When the co-occurrence data obtained from the bags is stored in the experience matrix EX1 as linear combinations of the sparse vectors, this may represent storing the co-occurrence data in a compressed format.

In an embodiment, the number n of elements $e_{ik}$ of an individual vector $v_k$ may be substantially smaller than the number of bags from which the co-occurrence data stored in the matrix EX1 was obtained.

It is not necessary to change the number n of elements $e_{ik}$ when new data is added from a new bag. This means that the matrix EX1 may be updated fast and easily by using co-occurrence data obtained from further bags. This also means that the size (i.e. the number of rows and columns) of the matrix EX1 may remain constant even when the matrix EX1 is updated by using co-occurrence data obtained from the further bags.

However, in an embodiment, it might be impossible to unambiguously determine (by using only the vocabulary VOC1 and the matrices RM1, EX1) which ones of the bags used for updating contained a given word. In this sense, storing co-occurrence data of the bags in the matrix EX1 may represent a lossy way of storing co-occurrence data.

The experience matrix EX1 may be initially a zero matrix (null matrix) but this is not necessary. The initial values of several vectors of the experience matrix EX1 may exhibit smooth spatial variation.

FIG. 2 illustrates how the experience matrix EX1 may be updated by using a bag of words. The bag of words may be e.g. the bag BAG1 shown in FIG. 1 b.

The symbols $W_1$, $W_2$, $W_3$ (with uppercase letter) denote the words of the bag BAG1. The $w_1$, $w_2$, ... $w_n$ (with lowercase letter) denote the words of the vocabulary VOC1. Typically, the first word $W_1$ of the bag is not the same as the first word $w_1$ of the vocabulary, but sometimes the word $W_1$ might perhaps be the same as the word $w_1$.

A vector of the experience matrix EX1 may be updated based on words contained in a bag. During the updating, the vector of the experience matrix EX1 may be called e.g. as a target vector.

The updating may comprise modifying the target vector (e.g. $v_P$) associated with a word (e.g. "mail") of the bag BAG1. A bag contains two or more words $W_1$, $W_2$, $W_3$, .... When the words $W_1$, $W_2$, $W_3$ belong to the same bag BAG1, this indicates, among other things, that the words $W_1$ and $W_2$ belong to the context of the word $W_3$.

One or more other words belonging to a bag together with a first word may be considered to belong to the context of the first word. A word may represent e.g. a state of a system and/or an external condition.

The target vector $v_P$ of the experience matrix EX1 associated with the word $W_3$ of the bag BAG1 may be identified by using the vocabulary VOC1. More precisely, the location of the vector $v_P$ (row) of the experience matrix EX1 associated with the value (=$w_p$, "mail") of the word $W_3$ may be determined by using the vocabulary VOC1.

The basic sparse vectors (e.g. $a_{k+1}$ and $a_{n-1}$) representing the other words $W_1$, $W_2$ of the bag BAG1 may also be found by using the vocabulary VOC1.

Adding co-occurrence data of a bag BAG1 to the experience matrix EX1 may comprise replacing the (first) target vector $v_P$ associated with the word $W_3$ of the bag BAG1 with a modified vector which is a linear combination of the (first) target vector $v_P$ and the basic sparse vectors $a_{k+1}$, $a_{n-1}$ representing the other words $W_1$, $W_2$ of the bag BAG1.

In an embodiment, the basic sparse vectors $a_{k+1}$, $a_{n-1}$ may be simply summed to the target vector $v_P$. In other words, the weighting coefficient of each basic sparse vectors $a_{k+1}$, $a_{n-1}$ used in the linear combination may be equal to one. However, the weighting coefficient of a basic sparse vector may also deviate from one in order to emphasize or reduce the contribution of the word represented by said basic vector. The weighting coefficient may be e.g. in the range of 0.1 to 10.

FIG. 2 shows a cross drawn over the basic vector $a_p$. When the experience matrix EX1 is updated by using the representative vectors of the basic matrix RM1, the vectors may be combined such the basic vector $a_p$ representing the word $W_3$ does not contribute to the modified target vector $v_P$ associated with said word $W_3$. A word always co-occurs with itself. Adding the contribution of the word's own basic vector would is not likely to add meaningful new data to the experience matrix.

A second target vector (e.g. $v_{n-1}$ shown in FIG. 1c) representing a second word (work, $W_2$) of the bag BAG1 may be modified by replacing the second target vector $v_{n-1}$ with a modified vector which is a linear combination of the second target vector $v_P$ and the basic sparse vectors $a_{k+1}$, $a_p$ representing the other words $W_1$ (morning), $W_3$ (mail) of the bag BAG1. If the bag contains a third word, a third target vector (e.g. $v_{k+1}$ shown in FIG. 1 c) representing a third word (morning, $W_1$) of the bag BAG1 may be modified by replacing the third target vector $v_{k+1}$ with a modified vector which is a linear combination of the third target vector $v_{k+1}$ and the basic sparse vectors $a_{n-1}$, $a_p$ representing the other words $W_2$ (work), $W_3$ (mail) of the bag BAG1.

If the bag contains more than three words, a target vector associated with each additional word may be updated by adding contribution of the other words of the bag, respectively.

The matrix may be updated by using words of a second bag, and by using words of any subsequent bags, respectively.

The two or more words $W_1$, $W_2$, $W_3$, ... of a bag BAG1 may be provided by a system (system words) and/or by a client (client words). The system words, may be e.g. words describing time and/or location. The "client" may be e.g. a human user, an application or a network service. The client words may be e.g. words obtained from a human user and/or from a running software application. A word may e.g. describe the state of a system.

Figure 3A:
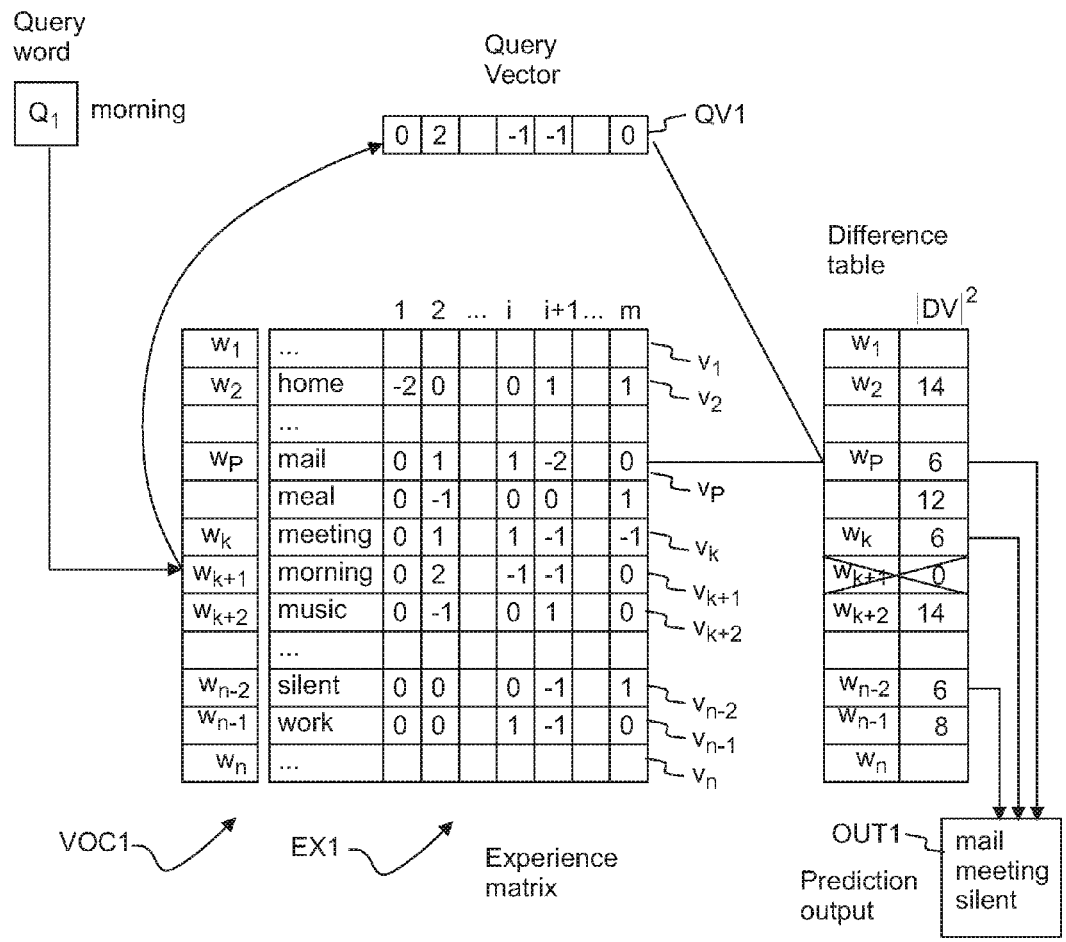
FIGS. 3a, 3b and 3c show providing a prediction by using an experience matrix, determining a difference of vectors in a context space, and providing a prediction by using an experience matrix.

FIG. 3a shows making a prediction by using the experience matrix EX1. The experience matrix EX1 may be e.g. the matrix shown in FIG. 1c or 4b.

One or more words representing a state of the system may be predicted by using the experience matrix EX1. The prediction method may comprise receiving one or more query words $Q_1$, $Q_2$, ... (FIG. 3c shows making a prediction by using two query words). The query words $Q_1$, $Q_2$ may be provided e.g. by the system and/or by a client. In an embodiment, a client may initiate the prediction process by sending one or more query words $Q_1$, $Q_2$. A vector $v_k$ of the experience matrix EX1 associated with the query word $Q_1$ (e.g. morning) may be found by using the vocabulary VOC1. In case of a single query word $Q_1$, the associated vector $v_k$ may be used as a query vector QV1 representing the query.

The query vector QV1 may now be compared with the vectors $v_1$, $v_2$, ... $v_n$ of the experience matrix EX1 in order to identify one or more vectors $v_1$, $v_2$, ... $v_n$ of the experience matrix EX1 which are substantially similar to the query vector QV1. During the comparing, the vectors $v_1$, $v_2$, ... $v_n$ of the experience matrix EX1 may be called as candidate vectors. The word or words associated with vectors having the smallest difference to the query vector QV1 may be determined and provided as the prediction output OUT1. The prediction method may comprise determining a difference between the query vector QV1 and each vector $v_1$, $v_2$, ... $v_n$ of the experience matrix EX1.

Figure 3B:
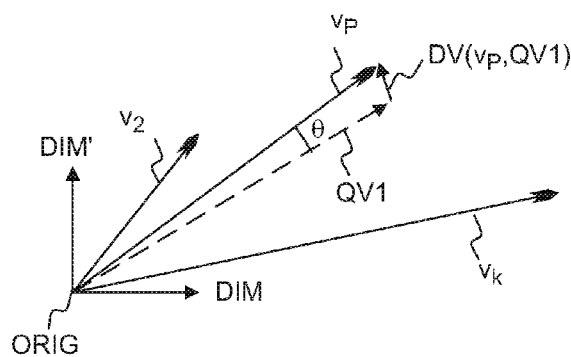
Figure 3C:
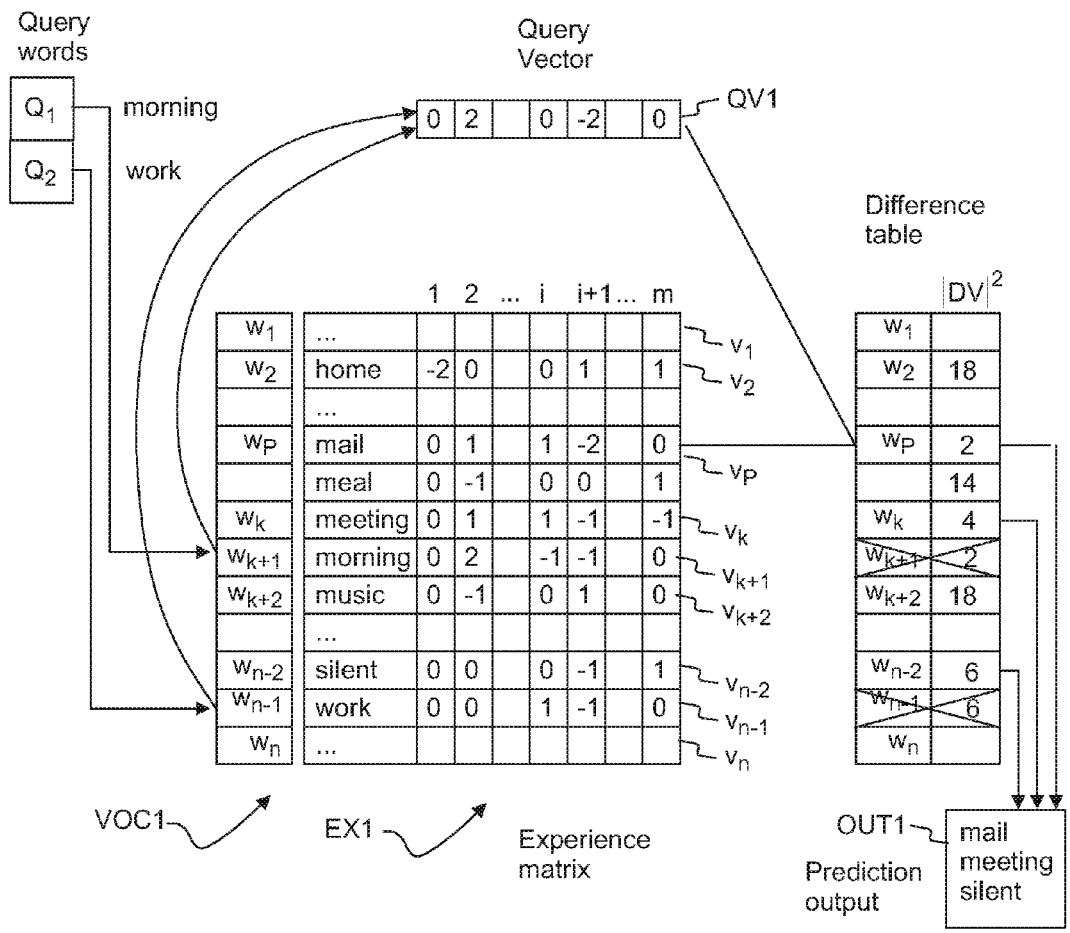

FIG. 3b illustrates the query vector QV1 and a few vectors of the experience matrix EX1 in the multidimensional space when the starting points of the vectors coincide (e.g. at the origin ORIG1). DIM and DIM' denote two dimensions of the multidimensional space (as discussed above, the number of dimensions of the space may be e.g. 10000 or higher). If two vectors have at least approximately the same length and at least approximately the same direction in the multidimensional space, this may be interpreted to indicate that said two vectors are associated with two words appearing in substantially similar context. If one of said words is a valid descriptor for a state of the system, it is likely that also the other word is a valid descriptor for a state of the system.

DV(QV1,v) denotes a difference vector between the query vector QV1 and a vector v of the experience matrix EX1. A value indicative of a difference between the query vector QV1 and a vector v of the experience matrix EX1 may be determined based on the query vector QV1 and a vector v of the experience matrix EX1. The "difference" may expressed e.g. by an angle θ between the query vector QV1 and the vector v of the experience matrix EX1. The "difference" may expressed e.g. by the cosine $\cos(\theta)$ of the angle θ between the query vector QV1 and the vector v of the experience matrix EX1. The cosine ($\cos(\theta)$) of the angle θ between two vectors v and QV1 may be calculated from the dot product, by using the equation $|v||QV1|\cos(\theta)=v \cdot QV1$. The difference may expressed e.g. by the Euclidean length |DV| of the difference vector DV. The difference may expressed e.g. by the dot product $QV1 \cdot v$ of the vectors. The difference may expressed e.g. by the square $|DV|^2$ of the Euclidean length |DV| of the difference vector DV. The difference may expressed e.g. as the taxicab length (Manhattan length) of the difference vector DV. Also other metrics may be used when defining the length of the difference vector DV. Also other metrics may be used when evaluating the difference between the vectors.

One or more prediction output words may now be selected from the vocabulary VOC1 based on the differences between the query vector QV1 and the vectors of the experience matrix EX1. If the difference between the query vector QV1 and a candidate vector fulfils a selection criterion, the word associated with said candidate vector may be provided as a prediction word.

The differences DV may be compared with each other in order to find the sparse vector or vectors which deviate by the smallest distance DV from the query vector QV1. In particular, the differences DV may be sorted. A word associated with a sparse vector having the smallest distance DV may be provided as the output OUT1 of the prediction method. The output may be called as the prediction. Also several words associated with sparse vectors having the smallest distance DV may be provided as the output OUT1. For example, $N_P$ words associated with candidate vectors having the smallest distance DV may be provided as the output OUT1, wherein the integer $N_P$ may be e.g. in the range of 2 to 10. In the example of FIG. 3a, the smallest difference values ($|DV|^2=6$) are associated with the vectors $v_P$, $v_k$ and $v_{n-2}$. If the number $N_P$ is set to be equal to three, the words "mail", "meeting" and "silent" may be provided as the prediction words.

The query words Q1, Q2 are already known to describe the situation. The query words Q1, Q2 may be excluded from the prediction words OUT1. Vectors associated with the query words Q1, Q2 may be excluded from the comparison when the query vector QV1 is compared with the other vectors of the experience matrix EX1.

The prediction word or words may be interpreted to be an answer to a conditional question "which prediction word or words OUT1 are likely to describe a situation if the situation is already described by the one or more (known) query words Q1, Q2. In the example of FIG. 3a, the prediction words were "mail", "meeting" and "silent", as determined from a single query word Q1 "morning".

One or more of these prediction words may be used for controlling a system. For example, a system could automatically activate an application for receiving and sending e-mails in a situation, which can be described by the word "morning". For example, a system could automatically set itself into a silent mode of operation in a situation, which can be described by the word "morning".

The one or more prediction words could be communicated back to a client making the query. The one or more prediction words could be communicated to a different client. The system may be arranged to utilize all prediction words for the control, or the system may be arranged to utilize a smaller subset of the prediction words for the control, wherein one or more prediction words may be ignored.

FIG. 3c shows making a query by using two or more query words Q1, Q2. Increasing the number of query words Q1, Q2 of a single query may improve the probability that the prediction word or words will be valid descriptors for the situation. In this example, the query consists of two words Q1, Q2. A first vector $v_k$ of the experience matrix EX1 associated with the query word $Q_1$ (e.g. morning) may be found by using the vocabulary VOC1. A second vector $v_{n-1}$ associated with the query word $Q_2$ (e.g. work) may be found by using the vocabulary VOC1. The query vector QV1 may now be determined as a linear combination of the vectors $v_k$, $v_{n-1}$ associated with the query words Q1, Q2. In particular, the query vector QV1 may be determined as the sum of the vectors $v_k$, $v_{n-1}$. Alternatively, the query vector QV1 may be formed e.g. by selecting the elements from the vectors Q1 and Q2 having maximum absolute value into the query vector QV1, or by another method of combining. The prediction words may be subsequently determined by comparing the query vector QV1 with the vectors $v_1$, $v_2$, ... $v_n$ of the experience matrix EX1, as described above for the case of FIG. 3a.

The prediction words may be subsequently formed by a method comprising:
  determining a first difference between the query vector QV1 and a first vector of the experience matrix EX1,
  determining a second difference between the query vector QV1 and a second vector of the experience matrix EX1, and
  comparing the first difference with the second difference.

Vectors $v_{k+i}$, $v_{n-1}$ of the experience matrix EX1 associated with the query words Q1, Q2 may be excluded from the comparison.

In this case, the vector $v_P$ of the experience matrix EX1 appears to provide a difference vector DV having the shortest length ($|DV|^2=2$). In this case, the prediction word corresponding to the vector $v_P$ is "mail". Also several words associated with $N_P$ vectors having the shortest distance vector DV to the query vector may be provided as the prediction. The number $N_P$ may be e.g. three. In this case, the words "mail", "meeting" and "silent" may be provided as the prediction words.

Figure 4C:
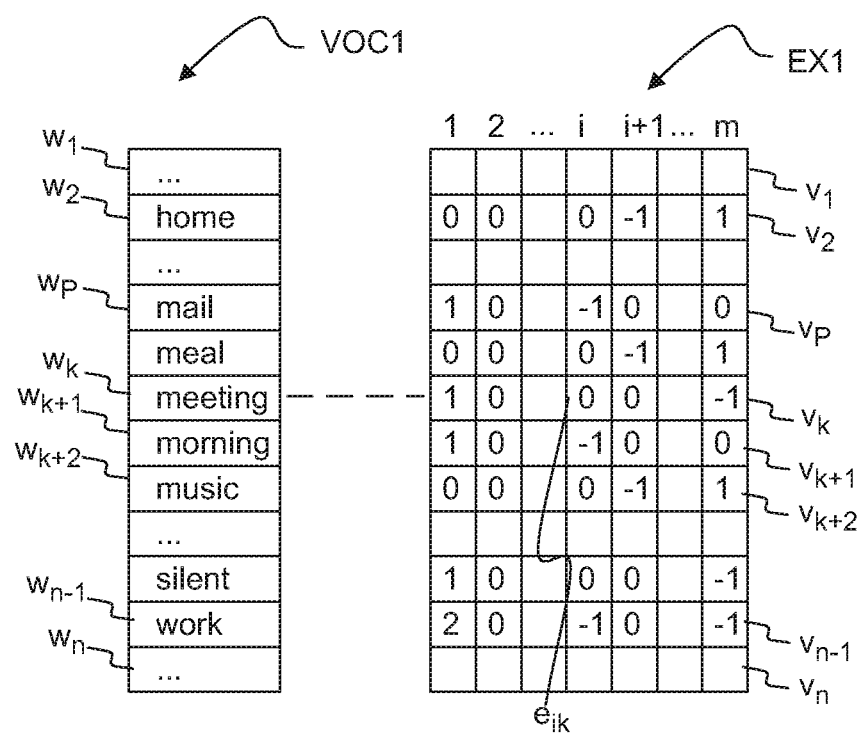

The updating method shown in FIGS. 1a-2 was based on representing individual words $w_1, w_2, \ldots w_n$ by different basic sparse vectors $a_1, a_2, \ldots a_n$. FIGS. 4a and 4b illustrate another way of storing co-occurrence data in an experience matrix EX1. The updating method shown in FIGS. 4a and 4c is based on representing bags by basic sparse vectors.

FIG. 4a shows three bags BAG1, BAG2, BAG3 of words. The bags may be e.g. the same as in FIG. 1b. Each bag BAG1, BAG2, BAG3 may be associated with a basic sparse vector $b_1, b_2, b_3$. Each bag BAG1, BAG2, BAG3 may be associated with a different basic sparse vector $b_1, b_2, b_3$ such that all words of a single bag (e.g. BAG1) are associated with the same basic sparse vector (e.g. $b_1$). The basic sparse vectors $b_1, b_2, b_3$ may fulfill the same criterions as the basic sparse vectors shown in FIG. 1a.

FIG. 4b shows updating the experience matrix EX1 by using co-occurrence data derived from the bag BAG1. The bag contains two or more words $W_1, W_2, W_3$ (e.g. the words "morning", "work" and "mail"). Each word $W_1, W_2, W_3$ of the bag BAG1 is now represented by the same basic sparse vector (e.g. $b_1$). The words $W_1, W_2, W_3$ of the bag BAG1 are the same as the words $w_p, w_{k+1}, w_{n-1}$ of the vocabulary VOC1. This allows finding the vectors $v_p, v_{k+1}, v_{n-1}$ of the experience matrix EX1 associated with the words of the bag BAG1. These vectors may be called as the target vectors.

The experience matrix EX1 may be initially a zero matrix (null matrix) but this is not necessary. The initial values of several vectors of the experience matrix EX1 may exhibit smooth spatial variation. The matrix EX may already contain vectors obtained as linear combinations of previous vectors of the matrix EX1 and sparse vectors. The experience matrix may in the latter situation be such that it is not saturated, that is, new data that is added to the matrix can still be reliably retrieved. An experience matrix having the property of not being saturated may be understood to be sparse in the sense of the present embodiments even though a high number of its elements deviate from zero.

The basic sparse vector $b_1$ representing the bag BAG1 may now be added to each target vector $v_p, v_{k+1}, v_{n-1}$ associated with a word of the bag BAG1. The same basic sparse vector $b_1$ is now common to all words of the bag BAG1. The same basic sparse vector $b_1$ may be added to all target vectors $v_p, v_{k+1}) v_{n-1}$ associated with the words of the bag BAG1. In general, a modified target vector associated with a word of the bag BAG1 may be formed as a linear combination of the target vector associated with said word and the basic sparse vector $b_1$. The second bag BAG2 may be represented by a different basic sparse vector (e.g. $b_2$). The basic sparse vector $b_2$ representing the second bag BAG2 may now be added to each target vector associated with a word of the bag BAG2. The third bag BAG3 may be represented by a different basic sparse vector (e.g. $b_3$). The basic sparse vector $b_3$ representing the third bag BAG3 may now be added to each target vector associated with a word of the bag BAG3.

Thus, the experience matrix EX1 may be updated by using contents of a plurality of bags BAG1, BAG2, BAG3. Several vectors of the experience matrix EX1 may eventually be linear combinations of different sparse vectors $b_1, b_2, b_3$.

FIG. 4c shows an experience matrix EX1 obtained after the co-occurrence data of the bags BAG1, BAG2, BAG3 has been stored in the experience matrix EX1 by using different basic sparse vectors $b_3$ representing the bags. The sum of all elements $e_{ik}$ of the matrix EX1 may be equal to zero. $e_{ik}$ denotes an element of the experience matrix EX1 belonging to the $i^{th}$ column and to the $k^{th}$ row. The value of the element $e_{ik}$ may be an integer in order to maximize data processing speed. The value of the element $e_{ik}$ is not limited to the range $-1$ to 1.

The experience matrix EX1 determined by using the method shown in FIG. 4b may be used for determining prediction words by using the methods shown in FIGS. 3a-3c. The experience matrix EX1 may have the same number (m) of columns and the same number (m) of rows as was discussed with reference to FIG. 1c. An individual element $e_{ik}$ of the experience matrix EX1 may have an integer value. The integer value may also be greater than 1 (e.g. 2) or smaller than $-1$ (e.g. $-2$).

Figure 5A:
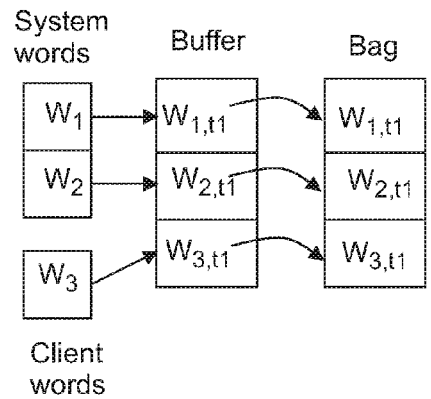
FIGS. 5a, 5b, and 5c show collecting words to a bag, and a situation where the words representing different instants of time.
Figure 5B:
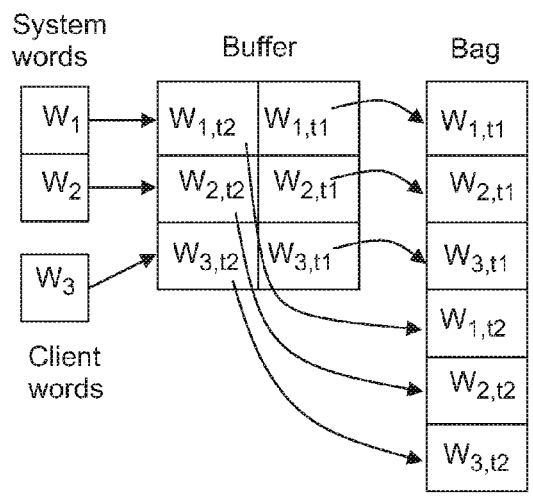
Figure 5C:
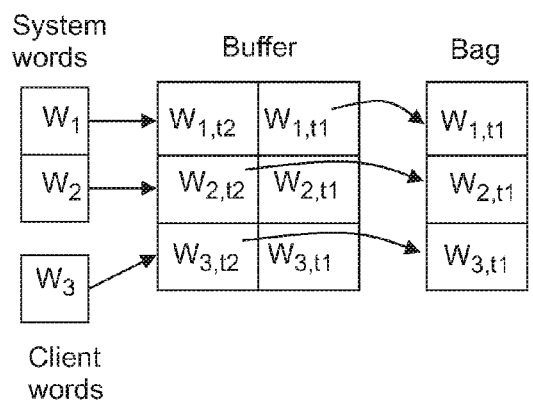

FIGS. 5a-5c show collecting words from a buffer to a single bag. Words may be received from one or more clients and/or from the system. The received words may be (temporarily) stored in one or more buffers. The words may be collected from the buffers to a bag. The experience matrix may be updated by using the contents of the bag. The experience matrix may be subsequently updated by using the contents of a second (different) bag.

In FIG. 5a, the words $W_{1,t1}, W_{2,t1}, W_{3,t1}$ of a bag may represent the same instant $t_1$. The bag may contain words representing a single instant. However, information about temporal relationships may be added to the experience matrix by using a bag, which contains words representing the state of the system at two or more different time instances $t_1, t_2$. Bags gathered by this kind of temporal combining (temporal "pairing") may also be utilized e.g. for evaluating the probability for a consecutive second state if the system is previously in a first state.

In FIG. 5b, the words $W_{1,t1}, W_{2,t1}, W_{3,t1} W_{1,t2}, W_{2,t2}, W_{3,t2}$ of a bag may represent two or more instants $t_1, t_2$. A single bag may contain words representing two or more different instants $t_1, t_2$. In case of FIG. 5b, the number of words in a single bag may be greater than the number of words representing a single instant $t_1$ or $t_2$. The time period between the instants $t_1$ and $t_2$ may be called as a time span.

In FIG. 5c, the words $W_{1,t1}, W_{2,t1}, W_{3,t1} W_{1,t2}, W_{2,t2}, W_{3,t2}$ of a bag may represent two or more instants $t_1, t_2$. The bag may contain words representing two or more different instants $t_1, t_2$. The collecting of words shown in FIGS. 5b and 5c may be used e.g. when the aim is to gather information about temporal relationships between words. The collecting of words shown in FIGS. 5b and 5c may be used e.g. when the aim is to gather information about temporal relationships between states of a system.

The method of FIG. 5b may be used e.g. when there is no earlier knowledge about the relevance of the words and/or no earlier knowledge about the temporal relationships of the words. The method of FIG. 5c may be used e.g. when some previous knowledge about causal or temporal relationships of the words is available. For example, The words $W_{1,t1}, W_{2,t2}$ may be collected to the same bag if the value of the word $W_{2,t2}$ is known to depend on the value of the word $W_{1,t1}$, the instant $t_2$ being later than the instant $t_1$.

The word $W_{1,t1}$ could describe e.g. the weather conditions at the time $t_1$ (e.g. "raining" at the time 14:00), and the word $W_{2,t2}$ could describe e.g. a marking in the calendar of a user (e.g. "sports" at 18:00). The prevailing weather conditions may be received e.g. from an internet service. In this case the weather conditions prevailing at 14:00 might have a causal effect on whether the user will be truly practicing sports outside at 18:00. In this sense, it might be useful to collect the earlier word "raining" and the later word "sports" into the same bag.

Figure 6:
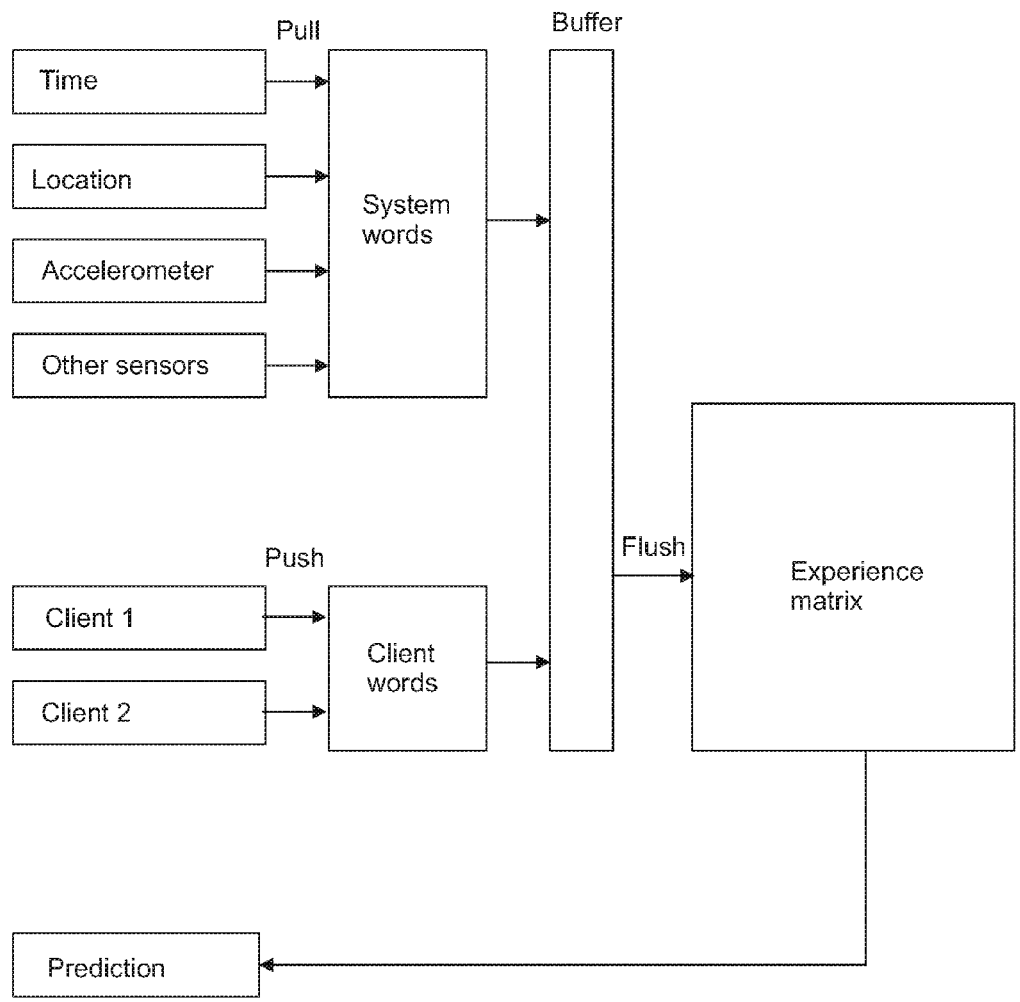
FIG. 6 illustrates gathering and processing data in a system comprising an experience matrix.

FIG. 6 shows a system for storing co-occurrence data to an experience matrix. System words describing time may be received e.g. from a clock. System words describing location (of a portable device) may be received e.g. from a GPS navigation unit (GPS means Global Positioning satellite System). System words describing the acceleration (of a portable) device may be received from an accelerometer. Words may also be received from other physical sensors. Client words may be received from one or more clients.

The term "pull" may mean that communication of data from the sensor to the buffer may take place such that the communication is not initiated by the sensor. In an embodiment, the sensor may provide a system word whenever requested. In an embodiment, communication of data from the sensor does not start updating the experience matrix.

The term "push" may mean that communication of data from a client to the buffer may be initiated by the client. In an embodiment, communication of data from the client may also initiate updating the experience matrix.

The term "flush" may mean updating the experience matrix by using one or more bags of words. The bags may be collected from the contents of the buffer.

The experience matrix may also be used when providing a prediction, as described above (See the discussion related to FIGS. 3a-3c).

Figure 7A:
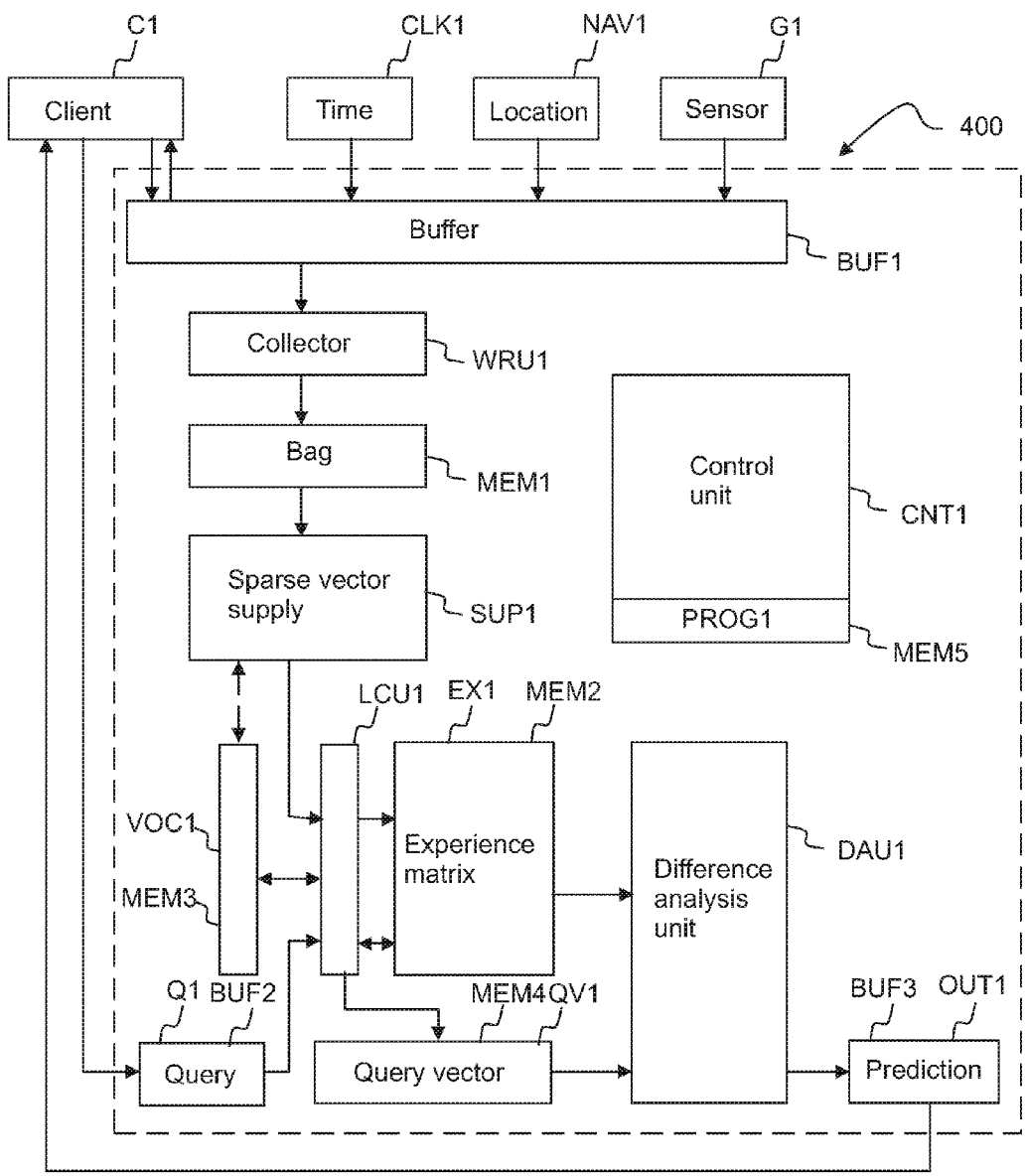
FIG. 7a shows a system configured to gather and process data by using an experience matrix.

FIG. 7a shows a subsystem 400 for processing co-occurrence data. The subsystem 400 may be arranged to store co-occurrence data in an experience matrix EX1. The subsystem 400 may be arranged to provide a prediction based on co-occurrence data stored in the experience matrix EX1.

The subsystem 400 may comprise a buffer BUF1 for receiving and storing words, a collecting unit WRU for collecting words to a bag, a memory MEM1 for storing words of the bag, a sparse vector supply SUP1 for providing basic sparse vectors, memory MEM3 for storing the vocabulary VOC1, the vocabulary stored in the memory MEM3, a combining unit LCU1 for modifying vectors of the experience matrix EX1 and/or for forming a query vector QV1, a memory MEM2 for storing the experience matrix EX1, the experience matrix EX1 stored in the memory MEM2, a memory MEM4 for storing the query vector QV1, and/or a difference analysis unit DAU1 for comparing the query vector QV1 with the vectors of the experience matrix EX1. The subsystem 400 may optionally comprise a buffer BUF2 and or a buffer BUF3 for storing a query Q1 and/or a prediction OUT1.

The words may be received from one or more sensors NAV1, G1, from a clock CLK1 and/or from one or more clients C1. The words may be collected to individual bags by a collector unit WRU1. The words of a bag may be collected (i.e. temporarily stored) in the memory MEM1. The contents of each bag may be communicated from the memory MEM1 to a sparse vector supply SUP1. The sparse vector supply SUP1 may be configured to provide basic sparse vectors for updating the experience matrix EX1.

The contents of each bag and the basic sparse vectors may be communicated to a combining unit LCU1, which may be configured to modify the vectors of the experience matrix EX1 (e.g. by forming a linear combination). In particular, the combining unit LCU1 may be configured to add basic sparse vectors to target vectors specified by the words of each bag. The combination unit LCU1 may be arranged to execute summing of vectors at the hardware level. Electrical and/or optical circuitry of the combination unit LCU1 may be arranged to simultaneously modify several target vectors associated with words of a single bag. This may allow high data processing rate.

The experience matrix EX1 may be stored in the memory MEM2. The words may be associated with the vectors of the experience matrix EX1 by using the vocabulary VOC1 stored in the memory MEM3. Also the vector supply SUP1 may be configured to use the vocabulary VOC1 (or a different vocabulary) e.g. in order to provide basic sparse vectors associated with words of a bag.

The subsystem 400 may comprise the combining unit LCU1 or a further combining unit configured to form a query vector QV1 based words of a query Q1. They query vector QV1 may be formed as a linear combination of vectors of the experience matrix EX1. The locations of the relevant vectors of the experience matrix EX1 may be found by using the vocabulary VOC1. The query vector QV1 may be stored in the memory MEM4.

The difference analysis unit DAU1 may be configured to compare the query vector QV1 with vectors of the experience matrix EX1. A difference analysis unit DAU1 may be arranged to determine a difference between a vector of the experience matrix EX1 and the query vector QV1. The difference analysis unit DAU1 may be arranged to sort differences determined for several vectors. The difference analysis unit DAU1 may be configured to provide a prediction OUT1 based on said comparison. The query words Q1, Q2 itself may be excluded from the prediction words.

The difference analysis unit DAU1 may be arranged to compare the vectors at the hardware level. Electrical and/or optical circuitry of the combination unit LCU1 may be arranged to simultaneously determine quantitative difference descriptors (DV) for several vectors of the experience matrix EX1. This may allow high data processing rate.

Figure 11:
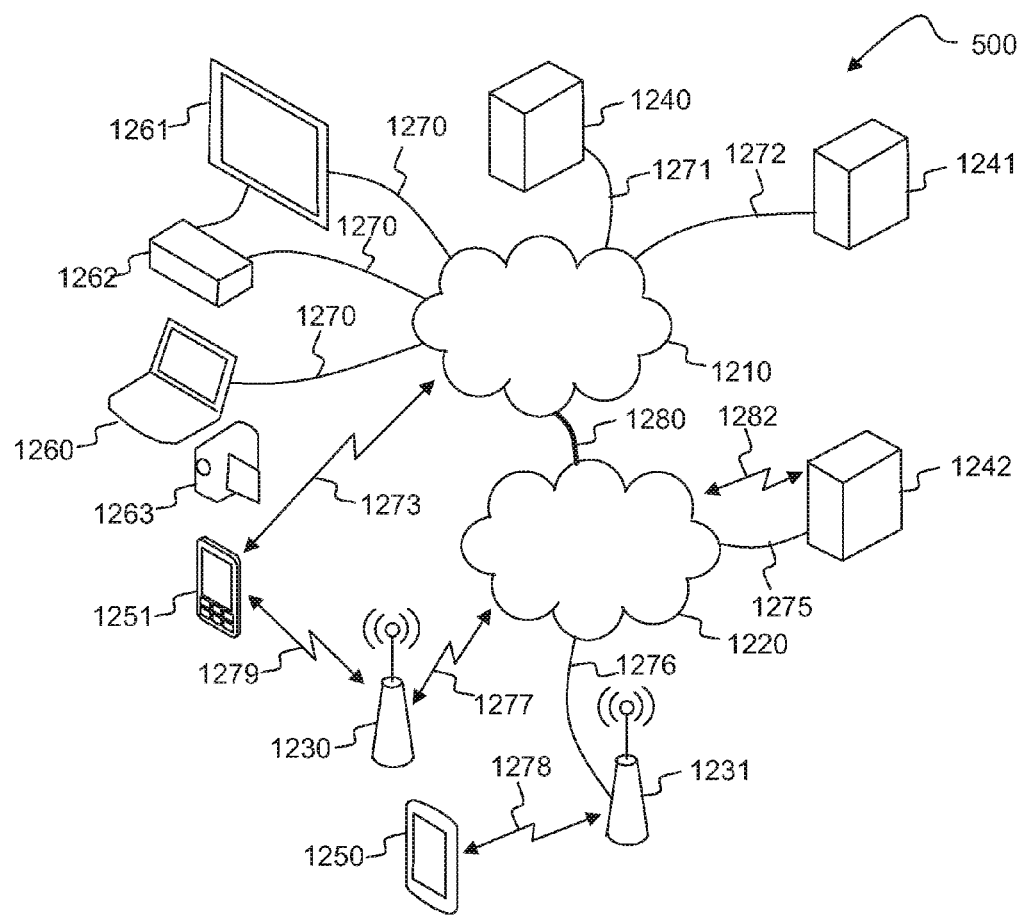
FIG. 11 shows a system comprising an experience matrix.

The subsystem 400 may comprise a control unit CNT for controlling operation of the subsystem 400 and/or for controlling operation of the system 500 (see FIG. 11). The control unit CNT may comprise one or more data processors. The subsystem 400 may comprise a memory MEM 5 for storing program code PROG1. The program code PROG1 when executed by one or more data processors may be for carrying out the method of the invention.

Words may be received e.g. from one or more clients C1, from one or more sensors G1, from a position sensor NAV1, and/or from a clock CLK1. The prediction word or words OUT1 may be communicated to the client C1 or to a different client. The client C1 may also retrieve system words from the buffer BUF1 e.g. in order to form a query Q1.

FIG. 7b shows, by way of example, how a word may be provided based on physical interaction between a sensor and its environment. A sensor G1 may provide one or more electrical or optical sensor signals $S_O$ by monitoring its physical environment. The monitoring comprises passive or active interaction with the physical environment. For example, in case of passive interaction, a microphone or a light sensor may receive sound or light waves (which are not initiated by the system). The signal $S_O$ may be e.g. an analog signal representing the magnitude and frequency of a sound wave received by a microphone. The signal $S_O$ may be e.g. an analog signal representing the magnitude and frequency of vibrations detected by an acceleration sensor.

In case of active interaction, the sensor G1 may transmit e.g. ultrasound or infrared light, which may be reflected from a surface of the environment. For example, the distance to the surface may be estimated e.g. based on the reflected sound or light waves received by a microphone or a light sensor.

Optionally, a digital sensor signal $S_1$ may be provided by processing the (analog) signal $S_0$ in a sensor interface GIN1. The digital sensor signal $S_1$ may comprise e.g. spectral analysis of a sound received by a microphone. The digital sensor signal $S_1$ may comprise a digital image captured by an image sensor.

Some sensors may directly provide a quantized digital signal, which may be directly used as a system word. For example, a microswitch proximity sensor may or a digital encoder of a joystick may directly provide digital words representing state of a system. For example, a microswitch may provide either a word "1" or a word "0" specifying whether something is pressing the switch or not.

Optionally, a quantizer QU1 may be arranged to provide a quantized sensor signal $S_2$ based on the digital sensor signal $S_1$. The quantization may be performed by using a mapping function, which may be modifier later, if needed. For example, sound volume values ranging from 0 to 127 (128 different values) may be mapped into a smaller number of values (e.g. 0, 1, 2).

Optionally, the quantizer QU1 may comprise an analyzer, which is arranged to classify the signal $S_1$ into two or more different classes. The quantizer QU1 may be a classifier. The quantizer QU1 may provide a value specifying the class of the signal $S_1$. For example, the quantizer QU1 may be arranged to provide values, which specify the class of a sound based on spectral analysis (e.g. "0"=motor, "1" music, "2" human voice).

A value provided by the quantizer QU1 may be used as an input word for the subsystem 400. Optionally the value may be converted to a (different) word e.g. in order to make it more easily intelligible to a human user.

The quantized sensor signal S2 may be optionally converted into a different word which describes the physical environment of the sensor in a natural language (e.g. in the English language or in Finnish language). The signal S2 may be converted into the word by using a dictionary. The contents of the dictionary may be fixed or it may be updated at a later stage. Numerical words (0, 1, 2) describing the nature of a sound may be converted into words of a natural language e.g. by using the following dictionary "0"—"motor", "1"—"music", "2"—"voice". Numerical words (0, 1, 2) describing the volume of a sound may be converted into words of a natural language e.g. by using the following dictionary "0"—"silent", "1"—"normal", "2"—"loud".

Optionally, a marker unit MRK1 may be arranged to modify a word by adding an identifier, which makes the word unique and different from other words. The identifier may e.g. specify the identity of the sensor S1 or the type of the quantity specified by said word. For example, when the word is a numerical word (e.g. "0", "1" and "2") describing sound volume, a prefix "volume" may be attached to the word so as to form e.g. a word "volume 0".

Thus, a sensor S1 may be arranged to provide a sensor word (system word) by using one or more method steps described above.

In an embodiment, an analysis unit receiving a signal from an acceleration sensor may be arranged to determine e.g. whether a portable device is stationary, carried by a walking person, carried by a running person, or carried in a moving vehicle. The analysis unit may provide words, e.g. "stationary", "walking", "running", "traveling" describing these different states. The acceleration sensor may be e.g. a capacitive or a piezoelectric acceleration sensor.

However, the signal obtained from sensor G1 does not need to be converted into a sensor word having a clear semantic meaning, i.e. it is not necessary to use the dictionary THESA1. In an embodiment, an analysis unit receiving a signal from an acceleration sensor may be arranged to provide sensor words describing different acceleration conditions, e.g. "acceleration A", "acceleration B", and "acceleration C". A system 500 comprising the subsystem 400 and the sensor G1 may be operated such that the system 500 can make successful predictions even if the semantic meaning of a sensor word is not known.

A word provided by a sensor G1 may be presented e.g. as a uniform resource identifier (URI) containing a scheme and a scheme specific part. For example, a word provided by using an acceleration sensor may be e.g. "motion://moving" or "motion://stationary", where the first part "motion" is the scheme, and the second part "moving" or "stationary" is the scheme specific part. The parts may be separated by the symbols "://". A word provided by using the acceleration sensor may also be e.g. "orientation://vertical" or "orientation://horizontal".

Referring to FIGS. 7a-7c, the sparse vector supply SUP1 may provide a sparse vector e.g. by retrieving a previously generated sparse vector from a memory (table) and/or by generating the sparse vector in real time.

Referring to FIG. 7c, the sparse vector supply SUP1 may comprise a memory for storing basic sparse vectors $a_1$, $a_2$, ... $a_n$ associated with words of the vocabulary VOC1 (see e.g. FIG. 1a). The basic sparse vectors $a_1$, $a_2$, ... $a_n$ may form a basic sparse matrix RM1. The basic sparse vectors $a_1$, $a_2$, ... $a_n$ may be previously stored in a memory of the sparse vector supply SUP1. Alternatively, or in addition, an individual basic sparse vector associated with a word may be generated in real time when said word is used for the first time in a bag. The basic sparse vectors may be generated e.g. by a random number generator. The configuration of FIG. 7c may be used e.g. when carrying out the updating method shown in FIGS. 1a to 2.

Referring to FIG. 7d, the sparse vector supply SUP1 may comprise a memory for storing a plurality of previously determined basic sparse vectors $b_1$, $b_2$, .... When a new bag arrives, trigger signal may be generated, and a count value of a counter may be changed. Thus a next basic sparse vector may be retrieved from a location of the memory indicated by a counter. Thus, each bag will be assigned a different basic sparse vector. The same basic sparse vector may represent each word of said bag, as described in the updating method of FIGS. 4a and 4b.

Referring to FIG. 7e, a new basic sparse vector $b_k$ may be generated by a random number generator RVGU1 each time when a new bag arrives. Thus, each bag will be assigned a different basic sparse vector (the probability of generating two identical sparse vectors will be neglicible). The same basic sparse vector may represent each word of said bag, as described in the updating method of FIGS. 4a and 4b.

Figure 7F:
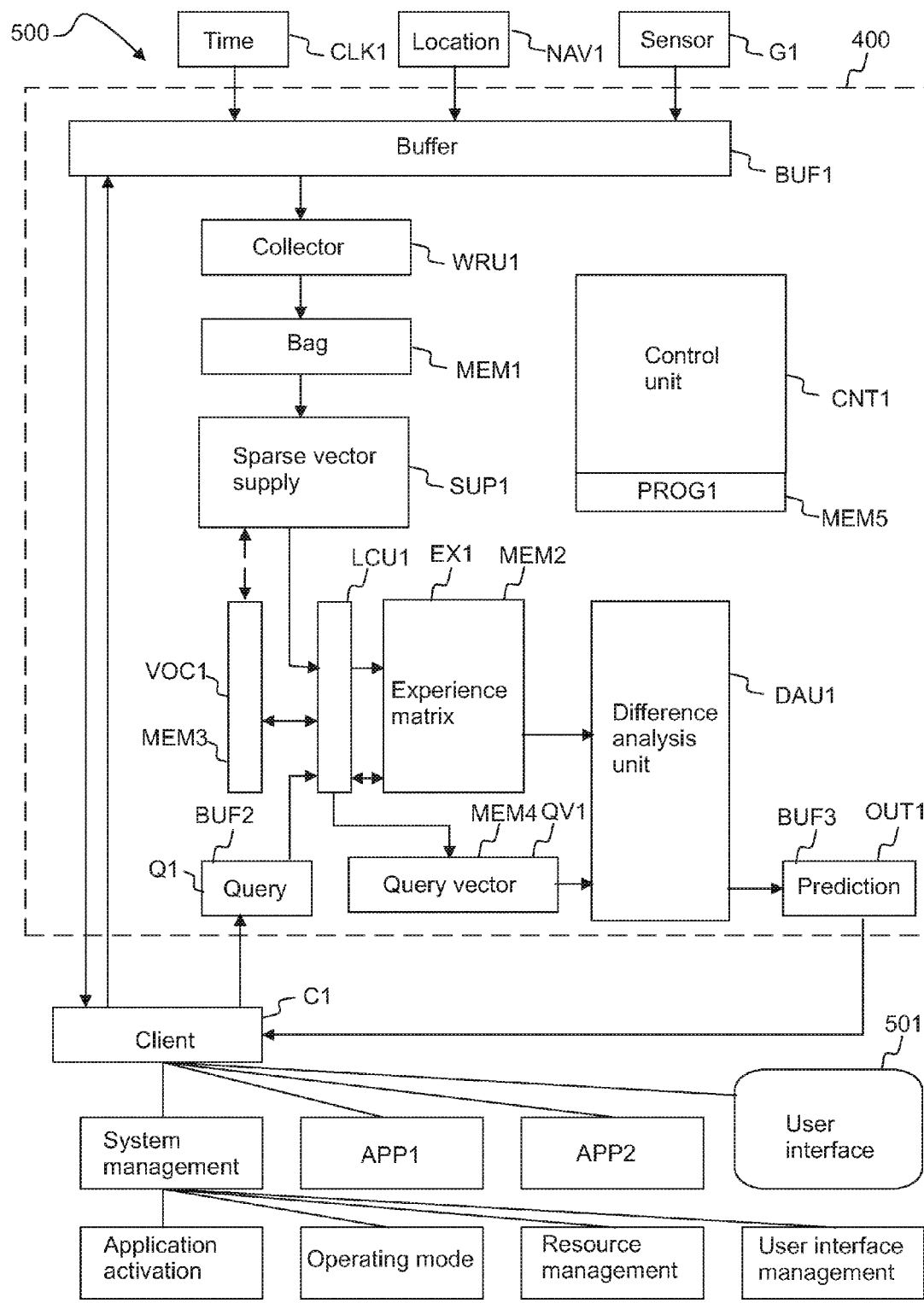
FIG. 7f shows a system, which is controlled based on a prediction made by using an experience matrix.

Referring to FIG. 7f, a system 500 may comprise the subsystem 400 for storing co-occurrence data and/or for providing predictions. The system may be configured to:
  provide one or more query words associated with a situation,
  make a prediction by using an experience matrix and said one or more query words, and
  control operation of said system based on said prediction.

The system 500 may optionally comprise one or more sensors G1 for providing system words describing e.g. status of the system or a property of an environment of the system. The system 500 may optionally comprise a clock CLK1 for providing time data. The system 500 may optionally comprise a location detector NAV1 for providing location data. The location detector may be e.g. a GPS navigation unit.

Co-occurrence data may be stored in the experience matrix EX1 as described above.

A client C1 may send a query Q1 to the subsystem 400. The query Q1 may comprise e.g. a word provided by a human user via a user interface 501, from an application APP1, and/or from a sensor G1 of the system 500. The query Q1 may comprise e.g. a word retrieved from an internet service (e.g. weather information). The subsystem 400 may provide one or more prediction words OUT1 based on the query Q1, as described above. The system 500 may be configured to start and/or stop an application APP1, APP2 based on a prediction OUT1. The operation of the system 500 may be controlled based on the prediction OUT1. The prediction OUT1 may be used e.g. as an input for a web browser. The system 500 may be configured to display information on a display of a user interface 501 based on the prediction OUT1 (user interface management). The system 500 may be configured to set an operating mode based on the prediction OUT1. The system 500 may be configured to allocated data processing power to different applications and/or units based on the prediction OUT1. The system 500 may be configured to start and/or stop operation of a functional (physical) unit of the system (e.g. a GPS navigation unit or an audio amplifier) based on the prediction OUT1.

Operation of a first device of the system 500 may be controlled based on words obtained from a second device of the system 500. For example, the first device may be carried by the user (a first person), and the second device may be carried by a second person. The second person may be e.g. a family member, a friend, or a workmate of the first person. The query Q1 may comprise one or more words related to the status of the second device and/or related to the calendar of the second person. The system may now provide a prediction OUT1 based on the query Q1. The system may propose activation of a functionality based on the prediction OUT1.

For example, if the second device has been set into the silent mode, the system, 500 may suggest based on the prediction that the preferred way of contacting the second person might be e.g. a SMS message or e-mail message, instead of making a phone call. The experience matrix EX1 may store co-occurrence data, which indicates that an attempt to make a phone call has almost never been successful when the second device has been set into the silent mode. The experience matrix EX1 may store co-occurrence data, which indicates that the user of the second device has sometimes immediately responded to an e-mail message even when the second device has been set into the silent mode. Thus, when the user of the first device attempts to make a phone call to the second person, the system 500 may propose activating an application for sending messages to the second device (e.g. SMS message or e-mail).

Figures 8A, 8B, 8C:
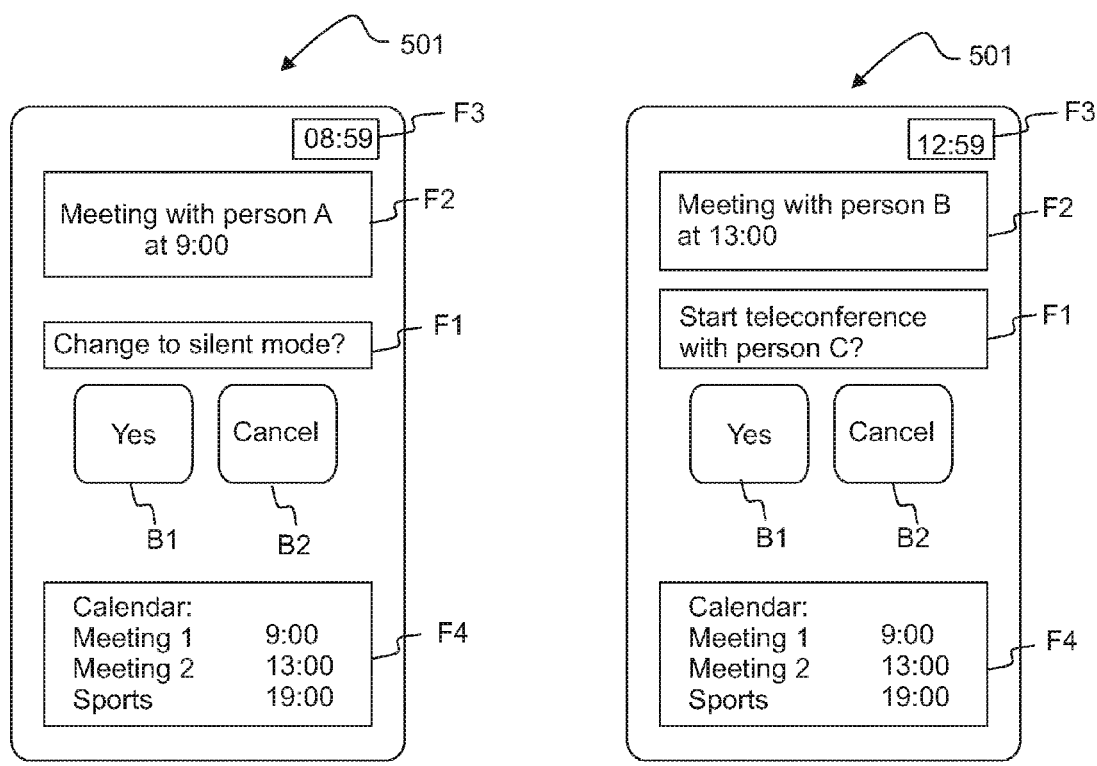
FIGS. 8a, 8b, 8c and 8d show bags of words, a user interface controlled based on a prediction, and method steps for preparing the system for a calendar event.

FIGS. 8a-8c show an example for controlling operation of a communications system by using predictions.

The experience matrix EX of the system 500 may be updated by using the bags BAG4 to BAG9 shown in FIG. 8a. In this example, the bags BAG4 and BAG7 contain the words "meeting", "Person A" and "silent mode". The bags BAG5 and BAG8 contain the words "meeting", "Person B" and "teleconference with person C". The bags BAG6 and BAG9 contain the words "meeting", "Person C" and "normal mode". The bags BAG4-BAG9 also contain words specifying time and the day of the week.

Referring to FIG. 8b, the system 500 may determine e.g. based on a marking in the calendar that a meeting with person A is scheduled to start at 9:00. Based on the experience, the words "meeting" and "Person A" often appear together with the word "silent mode". This co-occurrence data has been already stored in the experience matrix EX1. A client of the system 500 may form a query Q1 containing the words "9:00 ", "meeting", "Person A". The subsystem 400 may provide a prediction based on the query Q1" by using the experience matrix EX1 comprising the co-occurrence data of FIG. 8a. In this example, the prediction provided by the subsystem 400 may comprise e.g. the word "silent mode". Also the time and/or date specified by words of a query Q1 may have an effect on the prediction result. For example, meetings held at specific time and/or date may appear to be associated e.g. with "playing video". However, in this example, the dates and times of the bags are distributed so that it is not yet possible to detect that kind of an association.

When the meeting is about to start (e.g. at the time 8:59), the system 500 may propose changing the operation mode ("profile") to the silent mode e.g. in order to avoid disturbing the meeting with incoming telephone calls. One or more information fields F1-F4 may be displayed to the user. A field F1 may propose changing to the silent mode. The user may accept or reject the proposition e.g. by touching the (virtual) key(s) B1 or B2. In an embodiment the key B2 may be omitted. If the user does not touch the key B2 within a predetermined time period, the system may automatically change to the silent mode. In an embodiment the key B1 may be omitted. If the user does not touch the key B1, the system may continue operation in the normal mode. In an embodiment both keys B1, B2 may be omitted. The user may have previously authorized the system to set the operating mode automatically based on the prediction.

The fields F2-F4 may display auxiliary information. The field F3 may optionally display e.g. the actual time. The field F2 may optionally display e.g. the next relevant event (e.g. meeting with person A). The field F4 may optionally display e.g. a calendar view. In addition to setting the operating mode, the system 500 may also control displaying fields F1-F4, and/or displaying the keys B1, B2 based on the prediction.

Thanks to controlling operation based on the prediction, the user may now set the system to the silent mode by touching one key only. In an embodiment, the user does not need to do anything in order to set the system to the silent mode.

Without the prediction, the user might need to seek a suitable menu from the menu structure of the system in order to set the system to the silent mode. Typically, this operation would require making and confirming several selections in the menus of the menu structure of the user interface 501.

Referring to FIG. 8c, the system 500 may determine e.g. based on a marking in the calendar that a meeting with person B is scheduled to start at 13:00. Based on the experience, the words "meeting" and "Person B" often appear together with the word "teleconference with person C". This co-occurrence data has already been stored in the experience matrix EX1.

A client of the system 500 may form a query Q1 containing the words "9:00", "meeting", "Person B". The subsystem 400 may provide a prediction based on the query Q1" by using the experience matrix EX1 comprising the co-occurrence data of FIG. 8a. In this example, the prediction provided by the subsystem 400 may comprise e.g. the word "teleconference with person C". When the meeting is about to start (e.g. at the time 12:59), the system 500 may propose starting a teleconference with person C. One or more information fields F1-F4 may be displayed to the user. A field F1 may propose starting a teleconference with person C. The user or accept or reject the proposition e.g. by touching the (virtual) key(s) B1 or B2.

If the user accepts the proposition, the system may automatically start a teleconference. This may comprise automatically activating a camera module for capturing video images of the user. This may comprise (automatically) opening a video communication link and/or audio communication link with an interface of the person C at a remote location.

In an embodiment the key B2 may be omitted. If the user does not touch the key B2 within a predetermined time period, the system may automatically open the telecommunication link. In an embodiment the key B1 may be omitted. If the user does not touch the key B1, the system does not open the communication link. In an embodiment both keys B1, B2 may be omitted.

The user may have previously authorized the system to open the telecommunication link automatically.

Thanks to controlling operation based on the prediction, the user may now open the communication link by touching one key only. In an embodiment, the user does not need to do anything in order to open the communication link.

Without the prediction, the user might need to seek a suitable menu from the menu structure of the system in order to open the telecommunication link. Typically, this operation would require making and confirming several selections in the menus of the menu structure of the user interface 501.

Figure 8D:
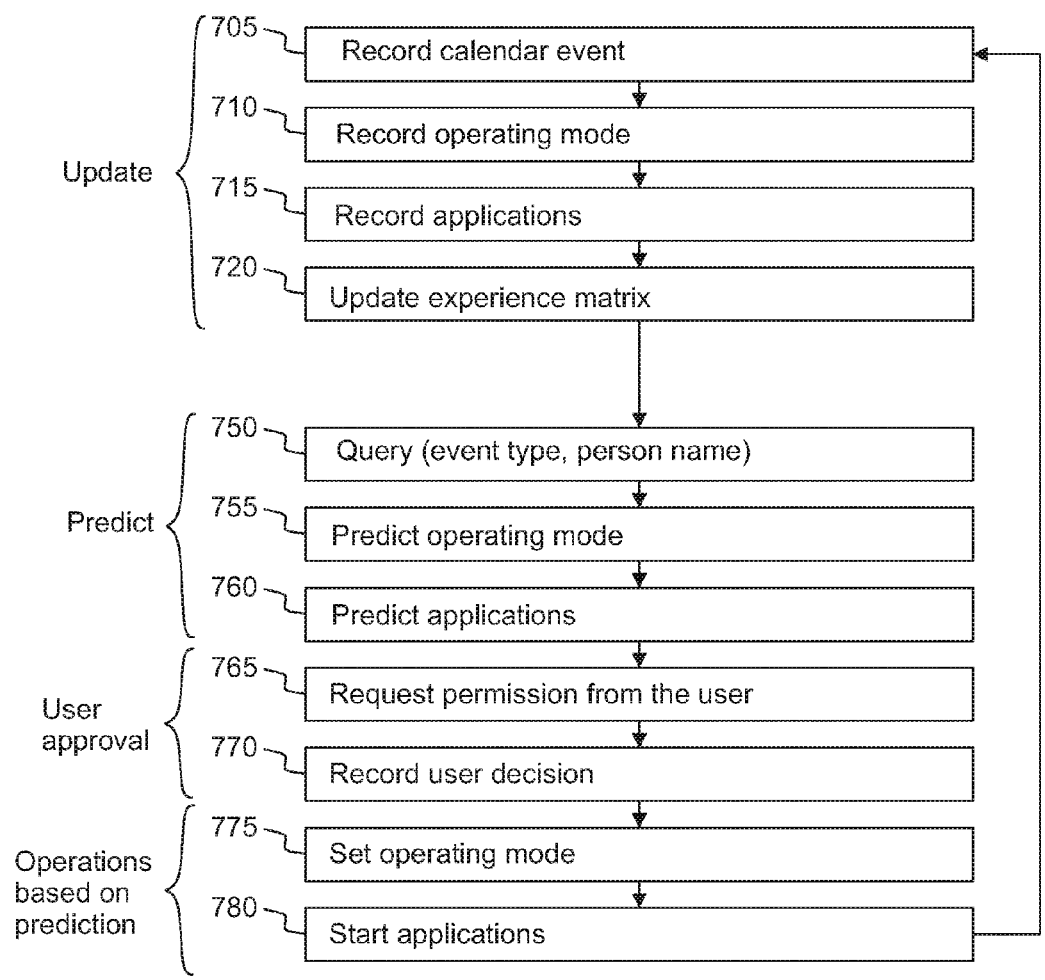

FIG. 8*d* shows method steps for updating the experience matrix EX and for controlling the system based on the prediction. In step 705, a scheduled event or an actual event may be stored in a memory of the system. In particular a calendar event may be added to the memory e.g. via the interface 501 by a user or by another person. In step 710, the user or another person may set an operating mode of the system, associated with the event mentioned in step 705. In step 715, the user or another person may start and/or stop one or more applications, associated with the event mentioned in step 705. In step 720, words describing the event, operating mode and/or applications may be collected into a bag. An experience matrix EX1 of the system 500 may be updated by using the bag. Co-occurrence data representing previous events may already be stored as the (sparse) vectors of the matrix EX1 before this step, i.e. the matrix does not need to empty prior to step 720. The steps 705-720 may be repeated several times in order to gather co-occurrence data related to several different events.

In step 750, the system may form a query Q1 comprising a word describing an event. The query Q1 may also comprise a word specifying additional information associated with the event, e.g. an identifier of a person, who is associated with the event. In step 755, the subsystem 400 may provide a prediction by using the query Q1 and the vectors previously stored in experience matrix EX1. In step 760, the system 500 may e.g. propose starting and/or stopping one or more applications and/or it may propose setting an operating mode based on the prediction. In step 765, the system may request permission from the user to carry out the action proposed in step 760. In an embodiment, the user may have given the permission in advance. In step 770, the response given by the user may recorder in a memory and used for updating the experience matrix EX1. In particular, a word describing the response may be collected in the same bag together with one or more other words related to the query Q1. The words of the bag may be used for updating the experience matrix EX1. In step 775, the operating mode may be set according to the prediction, if this was accepted by the user in step 765. In step 780, one or more applications may be started and/or stopped according to the prediction, if this was accepted by the user in step 765.

The steps 705-780 may be repeated several times. The steps 705-780 may be repeated e.g. several times per day during the lifetime of a portable device belonging to the system 500. The lifetime may be several years, e.g. more than three years. Thus, the experience matrix EX1 may eventually contain co-occurrence data representing e.g. more than 1000 events (data representing more than 1000 bags).

The memory MEM2 containing the experience matrix EX1 may be included in a first portable device carried by a user. The first portable device may be called e.g. as a smart phone and/or as a portable computer (which may have wireless communication capabilities). The first portable device may be e.g. one of the devices 1260, 1251, 1250 shown in FIG. 11.

Sooner or later, the first portable device may become outdated, it may be lost, or it may be broken. A (back-up) copy of the experience matrix EX1 may be stored in the system 500 in a location, which is remote and/or separate from the location of the memory MEM2. The experience matrix EX1 containing the previous data may be easily copied to one or more portable devices, if needed.

An experience matrix EX1 may be copied from the device of a first person to a device of a second person. An experience matrix EX1 may be transferred or copied from one device to another device e.g. via internet, via en electrical cable, via an optical cable, via a radio frequency link, via a mobile telephone network, or by using a physical memory (i.e. a computer memory product) storing the experience matrix EX1. The copying may be associated with a payment, i.e. the experience matrix EX1 may also be sold as an individual item, separately from the original system 500 which was used for collecting the data into the matrix EX1. An experience matrix EX1 may be wholly or partially transferred from one device to another, and may, but does not have to, replace partly or wholly the destination matrix. For example, a user may receive an update of the experience matrix related to a vacation trip, such as information regarding to Italian Alps.

The data stored in the experience matrix EX1 is likely to be useful when the queries Q1 contain same or like words which were used for updating the experience matrix EX1. Previous data stored in an experience matrix EX1 may be applicable only in a certain type of systems, wherein the data may be substantially useless in a second type of a system, which uses different query words and/or operates in a fundamentally different environment. For example, an experience matrix EX1 which only comprises data related to professional meetings is not likely to be useful for predicting which video clips the user wishes to view in his free time.

Figure 9A:
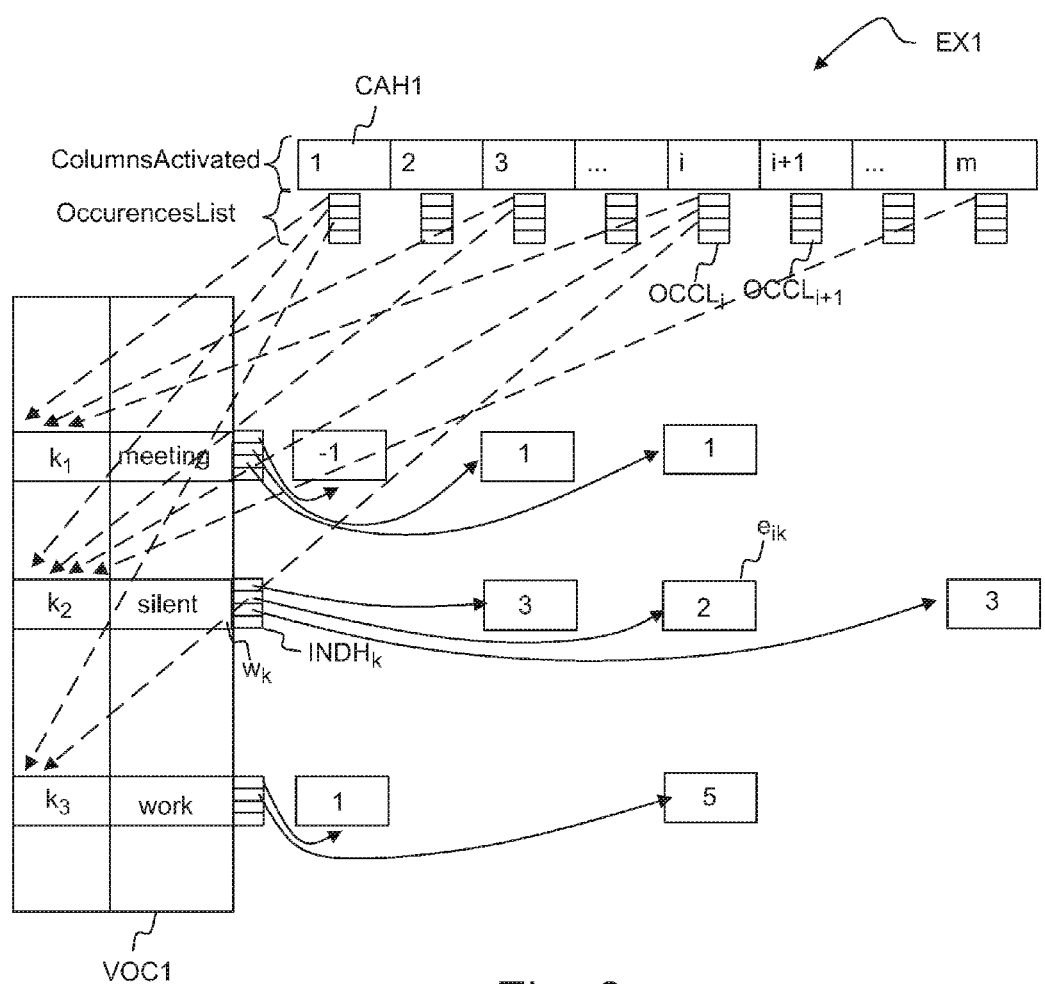
FIGS. 9a, 9b and 9c show representing an experience matrix as a group of hash tables, updating the experience matrix, and using the experience matrix for making a prediction.

FIG. 9*a* shows how an experience matrix EX may be represented by using hash tables. The majority of the elements $e_{ik}$ of an experience matrix EX1 may be zero elements. Several vectors of the experience matrix EX1 may be zero vectors. In that case, it may be needless to use memory space for storing the zero values. The vocabulary VOC1 may be a hash table, wherein each word stored in the vocabulary VOC1 may be used as the key. Entries in the vocabulary VOC1 point to value arrays INDH, which contain the actual values of the non-zero elements $e_{ik}$ of the experience matrix EX1. For example, an individual word $w_k$ may point to a value array $INDH_k$, which contains values of the non-zero elements of the vector $v_k$ of the experience matrix EX, said vector $v_k$ being associated with the word $w_k$. All elements of the value array $INDH_k$ may be non-zero.

A second hash table CAH1 may be used to keep track of those columns of the experience matrix, which contain non-zero elements. The second hash table CAH1 may be called e.g. as a "columns activated hash table". The second hash table CAH1 may have the column number (i) as the key. Entries in the second hash table point to occurrence arrays OCCL, which in turn may contain a list of row numbers (k) of words ($w_k$) contributing to each column of the experience matrix EX1. For example, an occurrence array OCCL, may contain the row numbers $k_1$, $k_2$, $k_3$, to indicate that the elements e at the column i and at the rows $k_1$, $k_2$, $k_3$ are non-zero.

The hash tables VOC1, CAH1, the group of the value arrays INDH and the group of the occurrence arrays OCCL may together fully specify the values and the locations of the non-zero elements of the experience matrix EX1.

A value array INDH may contain only the values of the non-zero elements of a single vector of the experience matrix EX1. It does not need to specify the indices of the columns of the experience matrix EX1 containing said non-zero values, because this information may be derived from the occurrence arrays pointing to the word associated with said value array INDH. However, the value array INDH may contain additional information in addition to the values of the non-zero elements, e.g. the indices of the columns of the experience matrix EX1 containing the non-zero values. The value arrays INDH may together form a value matrix. The occurrence arrays OCCL may together form an occurrence matrix.

Figure 9B:
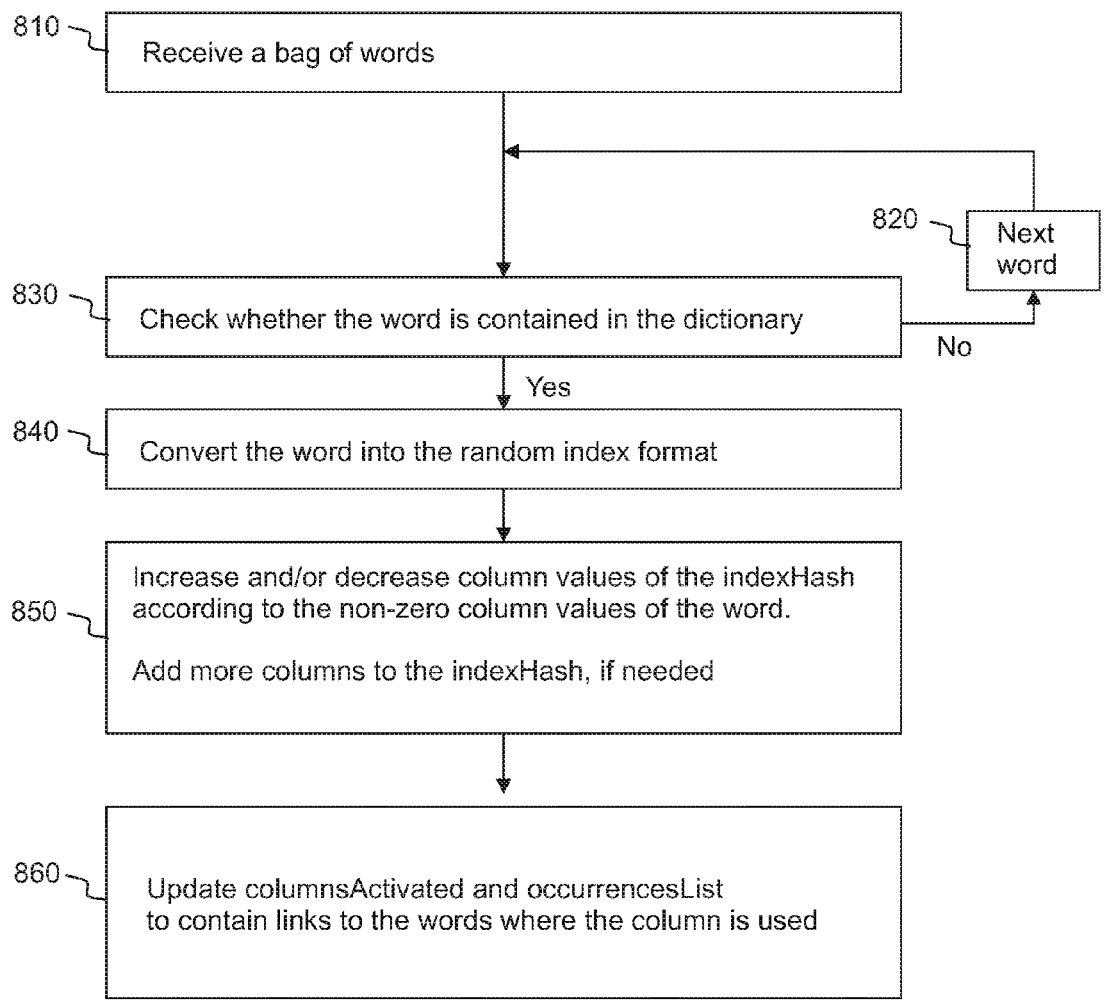

FIG. 9b shows method steps for updating an experience matrix EX1 represented by the hash tables. In this case, a predetermined group of words contained in the vocabulary VOC1 may be used in order to avoid changing the number of rows of the experience matrix EX1. Words not belonging to said predetermined vocabulary VOC1 may be ignored. In step 810, a bag of words may be received. In step 830, it may be checked whether a word of the bag is contained in the vocabulary VOC1. Words not contained in the vocabulary VOC1 may be ignored in step 820 in order to avoid changing the number of rows of the experience matrix EX1. In step 840, a basic sparse vector representing each word of a bag may be determined by using the vocabulary VOC1 and the basic sparse matrix RM1 (see FIG. 1a). Alternatively, a common (i.e. the same) sparse vector may be assigned to each word of a single bag (see FIG. 4a). The element values stored in a value array $INDH_k$ associated with a word $w_k$ of the bag may be updated by using the basic sparse vector or vectors. The updating method described in FIGS. 1a to 2 or the updating method described in FIGS. 4a to 4b may be used. An individual element value may be increased, decreased, or have its previous value. After update operations, the value of an element may become zero. In this case, the element may be removed from the matrix representation to save memory, or it may be left in with a zero value.

The number of non-zero elements of a vector of the experience matrix EX1 may also need to be increased during the updating. Thus, the length of a value array $INDH_k$ may be increased in order to store the additional values. The locations of the values stored in value array $INDH_k$ may be in the same order as in the vector of the experience matrix EX1 represented by said value array. This means that an element may be added also in the middle of a value array $INDH_k$ and/or to an end of the value array $INDH_k$.

In step 860, the hash table CAH1 and the occurrence arrays OCCL may be updated according to the new elements, which were possibly added to the value array INDH. If a non-zero value was stored in an element $e_{ik}$ in a column (i), which was previously a zero column, the hash table CAH1 may be updated to contain a pointer to an occurrence array OCCL, which in turn contains one or more pointers to the words where the column (i) was used. The hash tables VOC1, CAH1 and the arrays INDH and OCCL contain the co-occurrence data of an experience matrix EX1. An experience matrix EX1 may be represented in a hash table format, by using the hash tables VOC1, CAH1 and the arrays INDH and OCCL.

Figure 9C:
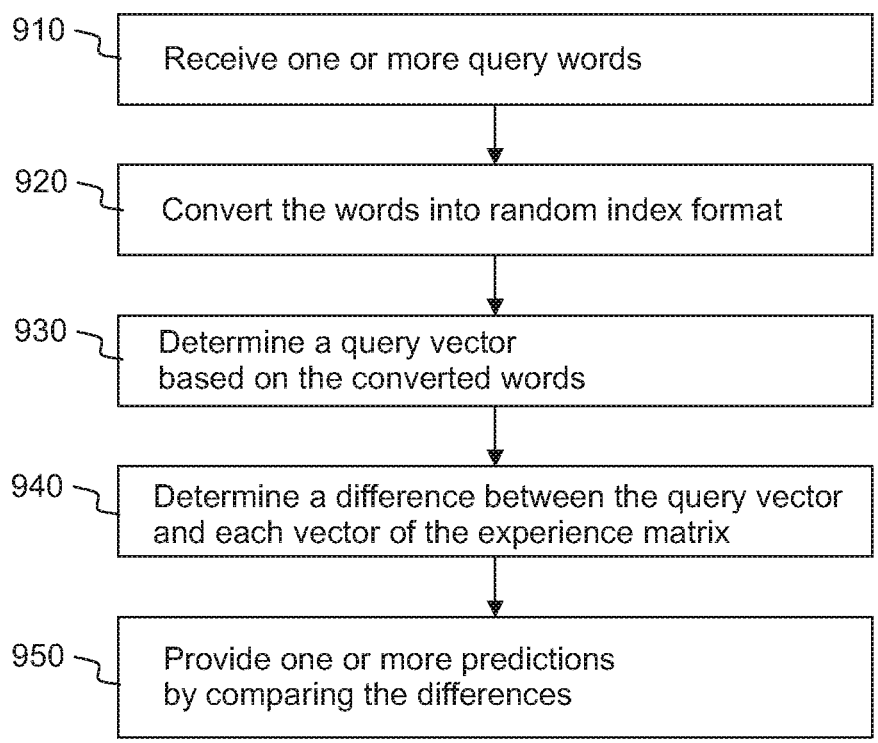

FIG. 9c shows method steps for making a prediction by using the experience matrix EX1. The experience matrix EX1 may be represented in a hash table format according to FIG. 9a. In step 910, a query containing one or more query words Q1, Q2 may be received. In step 920, vectors v of the experience matrix EX1 associated with each query word Q1, Q2 may be identified by using the vocabulary VOC1. When the experience matrix EX1 is represented in the hash table format, the non-zero values of the vectors may be specified by an array INDH.

In step 930, a query vector QV1 may be formed. In case of a single query word Q1, the associated vector of the experience matrix EX1 may be used as the query vector QV1 as such. In case of a query comprising two or more query words Q1, Q2, the query vector QV1 may be formed as a linear combination of the vectors identified in step 930. In particular, the query vector QV1 may be formed as a sum of the vectors identified in step 930.

In step 940, the query vector QV1 determined in step 930 may be compared with the vectors of the experience matrix EX1. The comparing may comprise calculating a difference between the query vector QV1 and each vectors of the experience matrix EX1. When the experience matrix EX1 is represented in the hash table format, the non-zero values of the vectors may be specified by an array INDH. In step 950, one or more words associated with one or more vectors having the smallest difference to the query vector QV1 may be selected and provided as the prediction words. The prediction words may be used for controlling the operation of the system 500, as described above.

Figure 10A:
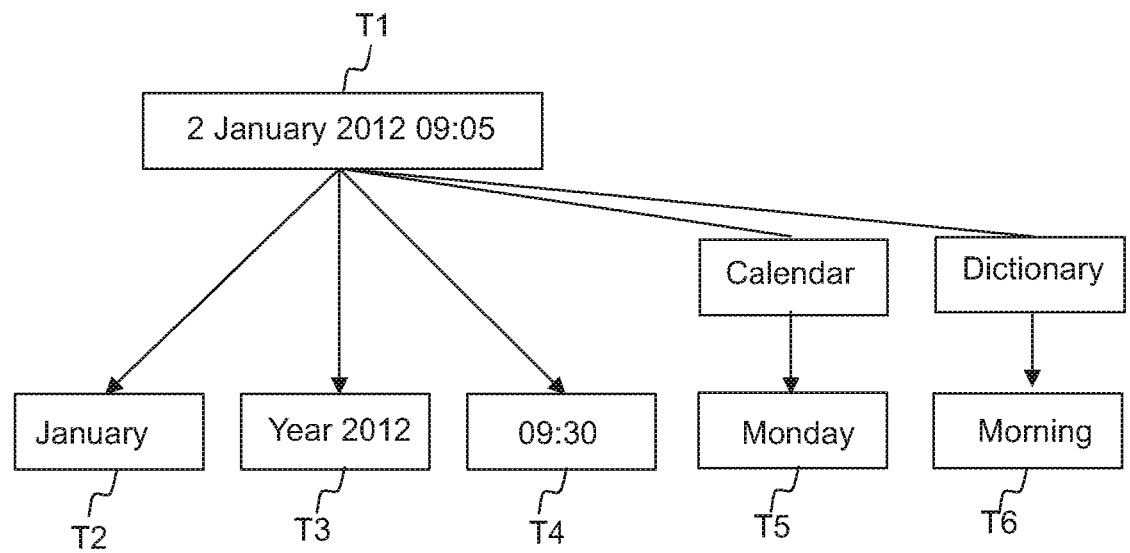
FIGS. 10a and 10b shows generating auxiliary words by using a calendar and/or a dictionary, and replacing a word with a second word by using a dictionary.

FIG. 10a shows generating one or more auxiliary words T2-T6 based on one or more original words T1. Using the auxiliary word instead of the original word or in addition the original word may sometimes be more useful when updating the experience matrix EX1 and/or when making a prediction.

The original word may be e.g. a string "2 Jan. 2012 09:03". In principle, another substantially similar string "2 Jan. 2012 09:04" would be interpreted to a completely different word. This might reduce the efficiency of updating and using the experience matrix EX1. The aim of the updating operations might be e.g. to gather co-occurrence data, which allows predicting actions, which are likely to be executed in a certain day(s) of a week. For this aim, the original word "2 Jan. 2012 09:03" may be replaced or supplemented with an auxiliary word T5, which specifies the day of the week (Monday) corresponding to the date 2 Jan. 2012. The auxiliary word T5 may be determined from the original word e.g. by using a calendar.

The time expression contained in the original word "2 Jan. 2012 09:03" might have too high temporal resolution for some purposes. For example, if the aim is to predict what would be a suitable time to start e.g. a virus scanning application (which will consume battery power and data processing resources), an auxiliary word T6 may be determined such that the auxiliary word T6 represents the clock time with a lower resolution (e.g. "morning") from the original word "2 Jan. 2012 09:03". The auxiliary word may be provided e.g. by using a dictionary and/or by using a quantizer (classifier).

For example, the following words may be used to represent time:
time://late night (to represent times from 00:16 to 04:00)
time://early morning (to represent times from 04:01 to 06:00)
time://morning (to represent times from 06:01 to 11:45)
time://noon (to represent times from 11:46 to 12:15)
time://afternoon (to represent times from 12:16 to 17:00)
time://early evening (to represent times from 17:01 to 19:00)
time://evening (to represent times from 19:01 to 23:45)
time://midnight (to represent times from 23:46 to 0015)

The original word may specify e.g. location. The location may be specified e.g. by using GPS coordinates and/or by providing a name of a location. One or more auxiliary words specifying a location may be determined from the original word e.g. by using an electronic map. The map may be e.g. downloaded from the internet. The one or more auxiliary words may be provided by a remote (internet) service.

For example, a first device of the system 500 may be located in a place called as "Vantaa" (in Finland), and a second device of the system 500 may be located in a place called as "Espoo" (in Finland). For example, an auxiliary word "Southern Finland" or "Capital area of Finland" may be determined from the word "Vantaa" e.g. by using an electronic map or a location dictionary.

For example, an auxiliary word "Southern Finland" or "Capital area of Finland" may be determined from the word "Espoo" e.g. by using an electronic map or a location dictionary. Thanks to the common auxiliary word, the co-occurrence data gathered by the first device may be used for providing a prediction relevant to the user of the second device.

The user of the system 500 may also associate a location with a name. For example, a portable device carried by the user may determine its location e.g. by a GPS navigation unit, and the device may also ask the use to give a name for the detected location. The name given by the user may be subsequently used as the word associated with said (GPS) location. The name may be e.g. "home", "school", "university", or "working place". One or more auxiliary words T2, T3, T4 may be formed from the original word by tokenizing and/or parsing. The auxiliary word or words T2 to T6 may be used in a bag instead of or in addition to using the original word T1. Also a broader uniform resource locator (URL) may be determined based on a narrower uniform resource locator. In particular, a broader uniform resource locator of the internet may be determined based on a narrower uniform resource locator of the internet.

Figure 10B:
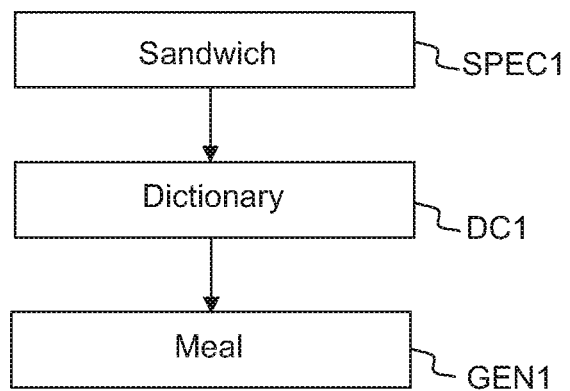

Referring to FIG. 10b, an auxiliary word GEN1 having a broader semantic meaning ("genus") may be determined based on an original word SPEC1 having a narrower semantic meaning ("species"). The auxiliary word GEN1 having a broader semantic meaning ("genus") may be determined from the original word SPEC1 by using a (semantic) dictionary DC1. For example, a word "meal" or "food" may be determined based on an original word "pizza". The dictionary DC1 may be downloaded e.g. from an (internet) service. The auxiliary word GEN1 may be provided by a remote service, based on the original word communicated to the service. The system may be configured to determine a semantic ancestor GEN1 of an original word. The semantic ancestor GEN1 may be subsequently used as a word in a bag or as a part of a query.

Also an auxiliary word having a narrower semantic meaning ("species") may be determined (by using a dictionary) based on an original word having a broader semantic meaning ("genus"). The system may be configured to determine a semantic descendant of an original word. This operation may be used for storing co-occurrence data e.g. in a situation where the original word is not contained in the vocabulary VOC1, but the term having the narrower semantic meaning is contained in the vocabulary VOC1. For example, a word "near 9 PM" may be generated based on an original word "evening". However, this operation may sometimes involve a risk of adding partly erroneous information.

Figures 12A, 12B:
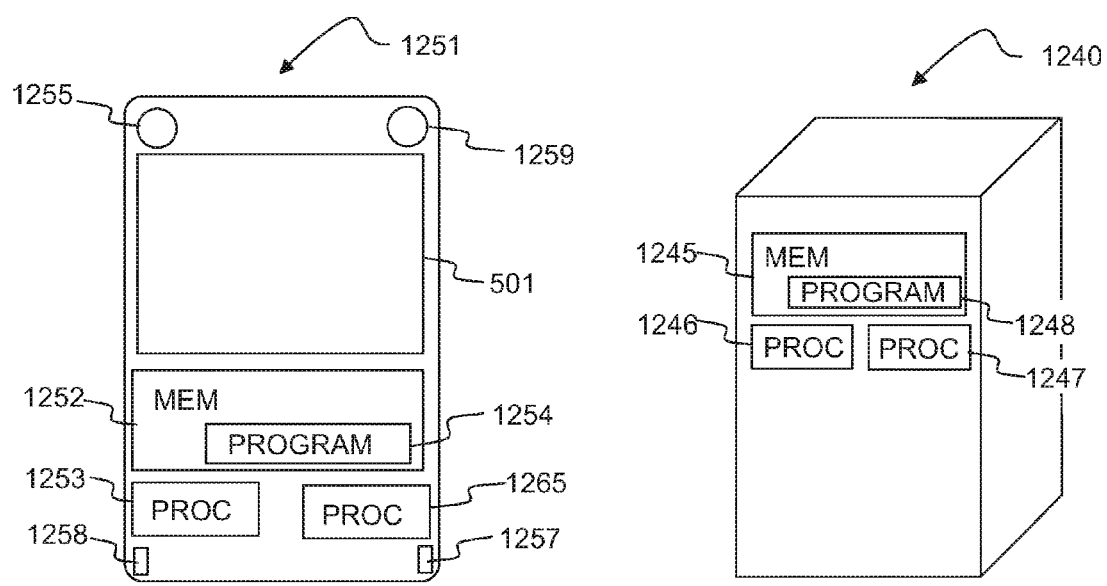
FIGS. 12a and 12b show different data processing devices.

FIGS. 11, 12a and 12b show a system and devices for determining a context (or making a prediction) using an experience matrix according to an embodiment. The context may be determined in a single device, in a plurality of devices connected to each other or e.g. in a network service framework with one or more servers and one or more user devices.

FIG. 11 shows, by way of example, a system 500 for gathering, storing and using co-occurrence data in an experience matrix. The operation of the system 500 may be controlled based on a prediction determined by using the co-occurrence data stored as vectors in the experience matrix EX1. The system 500 may comprise one or more subsystems 400 for updating an experience matrix EX1 and for providing predictions. Examples of the subsystem 400 were shown in FIGS. 7a and 7f. The system 500 may consist of a single device, or the system 500 may comprise a plurality of devices arranged to communicate with each other. A subsystem 400 may be implemented in a single device or in several devices arranged to communicate with each other. The system 500 may comprise a network service framework with one or more servers and one or more user devices. A subsystem 400 may be implemented in the network service framework with one or more servers and one or more user devices.

FIG. 11 shows a system comprising an experience matrix. In FIG. 11, the different devices may be connected via a fixed network 1210 such as the Internet or a local area network; or a mobile communication network 1220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 1280. The networks comprise network elements such as routers and switches to handle data (not shown), and communication interfaces such as the base stations 1230 and 1231 in order for providing access for the different devices to the network, and the base stations 1230, 1231 are themselves connected to the mobile network 1220 via a fixed connection 1276 or a wireless connection 1277.

There may be a number of servers connected to the network, and in the example of FIG. 11 are shown a server 1240 for providing a network service such as a social media service, a news site, a music store or a photo storage/sharing service and connected to the fixed network 1210, a server 1241 for providing another network service such as a data storage and backup service or a service for storing and sharing experience matrices and connected to the fixed network 1210, and a server 1242 for providing another or the same network service as above and connected to the mobile network 1220. Some of the above devices, for example the servers 1240, 1241, 1242 may be such that they make up the Internet with the communication elements residing in the fixed network 1210. An experience matrix may be stored in one or more of the servers 1240, 1241, 1242 or distributed across the servers e.g. so that some vectors of the experience matrix are stored in one server and some vectors in another server. There may be a number of experience matrices stored in any of the servers, for example from different users and/or for different purposes. One or more of the servers 1240, 1241, 1242 may provide a service or have the capability of modifying experience matrices e.g. by teaching, modifying in another way, redimensioning or combining. One or more of the servers 1240, 1241, 1242 may provide a service or have the capability of making a prediction (e.g. by determining a context) using an experience matrix.

There are also a number of end-user devices such as mobile phones and smart phones 1251, Internet access devices (Internet tablets) 1250, personal computers 1260 of various sizes and formats, televisions and other viewing devices 1261, video decoders and players 1262, as well as video cameras 1263 and other encoders such as digital microphones for audio capture. These devices 1250, 1251, 1260, 1261, 1262 and 1263 can also be made of multiple parts. The various devices may be connected to the networks 1210 and 1220 via communication connections such as a fixed connection 1270, 1271, 1272 and 1280 to the internet, a wireless connection 1273 to the internet 1210, a fixed connection 1275 to the mobile network 1220, and a wireless connection 1278, 1279 and 1282 to the mobile network 1220. The connections 1271-1282 are implemented by means of communication interfaces at the respective ends of the communication connection. The various end-user devices may have one or more experience matrices or parts of experience matrices in their memory. The various end-user device may have capability of modifying the experience matrices and/or making a prediction using an experience matrix.

It needs to be understood that different embodiments allow different parts to be carried out in different elements. For example, execution of a software application may be carried out entirely in one user device like 1250, 1251 or 1260, or in one server device 1240, 1241, or 1242, or across multiple user devices 1250, 1251, 1260 or across multiple network devices 1240, 1241, or 1242, or across both user devices 1250, 1251, 1260 and network devices 1240, 1241, or 1242. For example, the capturing of user input through a user interface may happen in one device, the data processing and providing information to the user may happen in another device and the control and management of context processing may be carried out in a third device. As another example, forming an experience matrix may happen in one device (or a plurality of devices), processing the experience matrices may happen at one device, and making a prediction may happen at another device. The different application elements and libraries may be implemented as a software component residing on one device or distributed across several devices, as mentioned above, for example so that the devices form a so-called cloud. A user device 1250, 1251 or 1260 may also act as web service server, just like the various network devices 1240, 1241 and 1242. The functions of this web service server may be distributed across multiple devices, too.

The different embodiments may be implemented as software running on mobile devices and optionally on devices offering network-based services. The mobile devices may be equipped at least with a memory or multiple memories, one or more processors, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The different devices may have various sensors e.g. for determining the physical properties or state of the environment or the devices such as temperature, time, humidity, lighting, sound volume, air pressure, position and movement.

The user device 1251 may comprise a user interface 501. A user may receive information via the interface 501. The user may control operation of the device 1251 and/or the system 500 by giving commands via the user interface 501. The user interface may comprise hardware, e.g. a display, keypad and/or a touch screen. The user interface may comprise a display screen for viewing graphical elements displayed on the screen. The user interface may also comprise a software application e.g. for displaying various different virtual keys on a touch screen.

A user interface 501 may be implemented e.g. in a stationary or movable device, which contains a camera arranged to receive commands from a user based on gesture recognition. The device may comprise a microphone arranged to receive commands from a user based on voice recognition. The user does not need to be in (mechanical) contact with a part of the user interface 501.

A user interface 501 may also be implemented in a device, which can be e.g. wrapped around the user's wrist (i.e. a wrist watch type device). A user interface 501 may be implemented e.g. in goggles (spectacles), which may comprise e.g. a virtual display for displaying information and/or a gaze direction detector to receive commands from a user by following his gaze direction.

The system 500 may be configured to carry out various tasks. Program code may be run in the system in order to carry out the tasks. These tasks may include e.g. creation of text, receiving and sending messages, playing music, capturing video, receiving news, receiving weather information, updating and viewing a calendar, browsing in the internet, and/or navigating in the streets of a city, etc. The system may further comprise one or more functional (physical) units to carry out the tasks. As the functional units, the system may comprise e.g. a video camera, a microphone, an audio reproduction unit, a display screen, an image projector, a radio frequency communication unit (WLAN, Bluetooth, NFC), a unit capable of communicating with a mobile communications network, a GPS navigation unit etc.

Words for the bags may obtained e.g. from one or more sensors G1. The sensors may include e.g. an acceleration sensor, a location sensor, a microphone, a radio receiver, an illumination sensor, a camera, an infrared radiation sensor, temperature sensor, air pressure sensor, magnetic compass.

A user device may be powered by a rechargeable battery. For example the user device may be carried by a traveling user such that the battery of the user device can be charged only occasionally (i.e. not at any time). Collected co-occurrence data may e.g. reveal in which kind of situations energy-consuming functionalities are typically activated by the user. Collected co-occurrence data may e.g. reveal when a possibility of recharging the battery is typically available.

In an embodiment, a battery operated system may be charged occasionally e.g. from an unreliable mains power network, from a local generator, from a solar cell and/or from a wind turbine. Co-occurrence data may reveal e.g. in which kind of situations energy-consuming functionalities are typically activated. Co-occurrence data may reveal how the availability of energy typically depends e.g. on the time (e.g. day or night), season (winter or summer), weather conditions (wind, non wind, sunlight, not sunlight). Co-occurrence data may reveal when a failure of the mains power network has typically happened.

The system 500 may comprise an uninterruptible power supply (UPS). In case of a power failure, unnecessary functionalities may be switched off based on predictions provided by the subsystem 400.

The word may be a string. The word may be a number. The word may comprise a sequence comprising letters and/or numbers. The word may comprise a sequence of ASCII codes represented in binary, decimal or hexadecimal format. The word may have a semantic meaning, but this is not necessary. The word may be a uniform resource identifier (URI) such as a uniform resource name (URN) or a uniform resource locator (URL). The word may be an abbreviation or an acronym. The "words" may also be called as "tags".

The co-occurrence data is gathered to the experience matrix EX by using groups of words called as bags. A bag of words may also be called as a group of words or as a set of words.

A prediction can be made by using co-occurrence data stored in the experience matrix EX1. The "prediction" may also comprise determining a word representing a present event or a past event, i.e. it does not necessarily refer to a future event. The prediction may mean estimating the most probable word or words describing a situation.

The length of the vectors of the experience matrix EX1 does not need to be increased even when data is gathered from a high number of bags. In an embodiment, an experience matrix EX1 may comprise co-occurrence data gathered from $N_{BG}$ bags such that the number $N_{BG}$ of the bags (i.e. "documents") is substantially higher than the number m of columns of the experience matrix EX1.

The "context" of a word may mean a verbal environment of said word such that said word (itself) is excluded from said environment. In this sense, a word does not belong to its own context.

The vectors of the experience matrix EX1 and the query vector QV1 may comprise information about the verbal environment of one or more words. The vectors of the experience matrix EX1 may also be called as context vectors. The query vector QV1 may also be called as a context vector.

In general, entries of the vocabulary VOC1 may be strings containing one or more symbols.

In an embodiment, entries of the vocabulary VOC1 may be numbers instead of being natural language words. Entries of an auxiliary table may be natural language words, and the auxiliary table may contain pointers to the numbers of the vocabulary VOC1. A word of natural language may be mapped to a number by using the auxiliary table. A number may be mapped to a word of natural language by using the auxiliary table. The auxiliary table may be called e.g. as a natural language dictionary. In particular, the auxiliary table may be a multilingual dictionary containing words of several different natural languages. A first word of a first natural language and a second word of a second natural language may be associated with the same entry of the vocabulary VOC1 by using the multilingual dictionary. A first word of a first natural language and a second word of a second natural language may be associated with the same number of the vocabulary VOC1 by using the multilingual dictionary. The multilingual dictionary may comprise e.g. an English-to-number dictionary, a Finnish-to-number dictionary and/or a German-to-number dictionary. Thus, the same vocabulary VOC1, the same basic matrix RM1 and/or the same experience matrix EX1 may be used with English, Finnish and/or German words.

TABLE 1

An example of a dictionary for associating words of one or more natural languages with numbers.

| 1st Language | 2nd language | 3rd language | number |
| --- | --- | --- | --- |
| dog | koira | hund | 23624521 |
| cat | kissa | katze | 63245234 |

The words of this table are not to be translated during proceedings of this patent or patent application.

Thus, the system 500 may handle multilingual information. The system 500 may gather information from several different states e.g. via the Internet. The resulting experience matrix EX1 may be language-independent. The same experience matrix EX1 may be used globally.

FIGS. 12a and 12b show different data processing devices where forming and/or modifying and/or determining the context (or making the prediction) may be carried out according to an example embodiment. As shown in FIG. 12b, the server 1240 contains memory 1245, one or more processors 1246, 1247, and computer program code 1248 residing in the memory 1245 for implementing, for example, the functionalities of a software application like a service for storing or processing an experience matrix. The different servers 1240, 1241, 1242 may contain at least these same elements for employing functionality relevant to each server. Similarly, the end-user device 1251 contains memory 1252, at least one processor 1253 and 1256, and computer program code 1254 residing in the memory 1252 for implementing, for example, the functionalities of a software application like a browser or a user interface of an operating system. The end-user device may also have one or more cameras 1255 and 1259 for capturing image data, for example video. The end-user device may also contain one, two or more microphones 1257 and 1258 for capturing sound. The end-user devices may also have one or more wireless or wired microphones attached thereto. The different end-user devices 1250, 1260 may contain at least these same elements for employing functionality relevant to each device. The end user devices may also comprise a screen for viewing a graphical user interface.

Figure 13A:
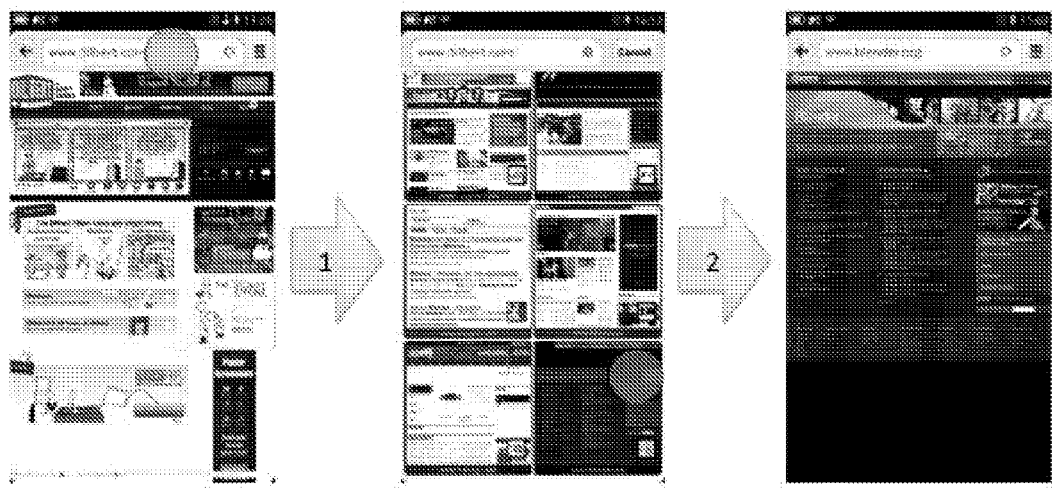
FIG. 13a shows an example of a user interface sequence of a predictive browser according to an embodiment.

FIG. 13a shows an example of a user interface sequence of a predictive browser according to an embodiment. An experience matrix (Random Index) based prediction system as explained with FIGS. 1 to 12 may be used to suggest to the user next web pages to visit. The suggestions may be based on former browsing history, contextual information (time, location, sensors etc.) and also information from other client applications like calendar. The algorithm is continuously learning and adapting, as the experience matrix is taught. It may learn the user's habits and suggests URLs (addresses) best suited for the given situation. Suggestions may be represented by images instead of text.

The browser may interact with the service trough the following asynchronous operations.

During a push operation the browser provides a bag of words. The words may be plain words and/or system words. Plain words may be taken from the page content or can be generated based on the content. System words may order the service to use system information like time, location and sensor data. This operation may be indirectly initiated by the browser during the push and predict operations. Plain and system words may be mixed in the same push. The bag of words may define a context. The words in the same context are related words. The pushed words are stored in an input buffer until the next flush operation. There can be multiple push operations before a flush. A predictive browser may carry out push, flush and predict in background during the user's browsing.

The relation between words is captured in the experience matrix during the flush operation. This is how the prediction provider learns the browsing habits. URLs are also considered as words. This way the relation between contextual information, content and URL can be captured. During a flush the experience matrix is updated with the content of the input buffer.

For initiating predictions the browser provides a bag of words descrybing the actual context. The bag of words may be the same kind of word list like in the push operation. This bag of words may be used to calculate most related URLs in the experience matrix. That is, the closest sparse vectors in the experience matrix to the sparse vectors of the bag of words are determined as described earlier. The resulting URLs may then be used in the predictions view of the browser to show suggested pages e.g. as images. Images may be provided as snapshots of former visited pages or as icons of the visited site etc. Snapshots may also be obtained from a snapshot server.

The push, flush and predict operations may be initiated by browser events. For example, the "page loaded" event may be used to initiate a push-flush-predict sequence. Naturally other events and sequences are possible.

In FIG. 13a, the user is initially browsing a webpage. When the page is loaded, the page content, the contextual system information and/or the URL may be sent to an experience matrix based prediction service e.g. in the background. The service may be ordered to flush its input buffer (update the experience matrix). Then (still in the background) predictions may be asked from the service using the same context as before in the flush. The service may send back URLs that are used to update the predictions view.

When the user wants to navigate away from the page and taps the address bar, this makes the browser switch to the already updated predictions view. In the predictions view, e.g. images or titles of the suggested pages may be shown. In this view, the user may decide to select one of the predictions or type a new URL or search text.

The user may navigate to the suggested pages by tapping on their image. Then the view changes back to the browsing view and the selected page is downloaded.

When starting the browser there may be no page loaded yet. In this special case, predictions may be provided by using contextual information only, e.g. system time, location, sensor information etc.

Figure 13B:
FIG. 13b shows an example of a user interface of a predictive browser with suggestions for related content according to an embodiment.

FIG. 13b shows an example of a user interface of a predictive browser with suggestions for related content according to an embodiment. In a similar manner to FIG. 13a, predictions may be formed based on the context and the browsing history, e.g. the current page. In addition to web pages, the predictive browser or another application may provide suggestions of other data related to the current web page. For example, location, time and names of places may be used to retrieve photos, a weather service for the place on the web site, and related entertainment like music, movies or games. These additional data may be identified in a similar manner to identifying web pages based on descriptions of the data.

FIG. 14 shows an abstraction metadata list for predictive browsing according to an embodiment.

Predictive capability in a predictive browser may be provided in such a way that first content of visited web pages is pushed to the experience matrix. To do this, web page source code may be taken, cleaned from HTML and other such tags and program code, and push the remaining content to the experience matrix. This way, the random index algorithm is able to learn user's contexts.

However, using this basic method it may sometimes be difficult to get accurate predictions. There may be too much content on web pages that is not really relevant to the user context. This includes unrelated advertisements, unrelated pop-ups, and other such things common in the internet. At some internet sites, it seems even that the article that the user is interested in is well hidden behind all the unrelated content, to the irritation of the user. It is a difficult task for a software program to try to perceive the user's context from this kind of a disorder. It is demanding to programmatically separate and reveal exactly the content that is important from user's perspective from all the surrounding noise.

To overcome or alleviate these challenges, a way of creating abstraction data into an experience matrix is provided here. Abstraction data for internet sites may by hand (or by machine), and to fed into an experience matrix at system manufacture, startup or at periodic updates.

In this method, a person (or a machine) may select some number of most visited Internet sites, browse to those sites, and create site abstraction data (metadata) an example of which is shown in FIG. 14. The metadata may contain the URL of the site, an area or country for whose users this URL may be of importance, hyperlinks embedded in the page, company name of the website, and words that relate to the site content in an abstract level. To find the most relevant bag of words from webpage, the preprocessing may be done e.g. in a separate server which can then be queried. There may be more categories of information, like time of day for example, which will be gathered as metadata as well.

The abstraction data (metadata) may be pre-taught into an experience matrix of a user's device carrying a predictive browser. This way, the predictive browser application may use this abstraction metadata as a basis for calculating and suggesting the next website to be visited by the user. The predictive browser may use this metadata, even solely, as a basis for context calculation. This is contrary to a method where all data found on the web site is used for context calculation.

Abstraction metadata may be created for a large amount of Internet sites, as per country. The selection of which URLs to include may be based on site popularity (e.g., whether the site is among the 1000 most visited in this country.) This way it may be most probable that the user gets the benefit of the pre-taught abstraction metadata. The abstraction metadata formed in such a way may be made into a network service run on one or more of the servers of FIG. 11. Thereby, a predictive browsing system may load these abstraction metadata from the service in order to update the experience matrix. The metadata service may also provide ready-made abstraction metadata experience matrices that can be simply added to an experience matrix in the user's device, or that can be used as such for the predictive browser.

This methodology may also contain a possibility for online updates of the metadata. In this scenario, the metadata is available at some predefined update server, from where the experience matrix implementation periodically, at user request, or asynchronously goes to fetch new metadata. This way, changes in site content can be effectively reflected to predictive browsers on client's devices.

Abstraction metadata such as in FIG. 14 may be prepared by hand or by machine. This metadata may be loaded into an experience matrix implementation in the system. This may be done for example in three ways: at assembly line during manufacturing of a user device, fetched from a predefined server when the device is for the first time connected to the internet, or at periodic or asynchronous updates during lifetime of the device. For the purpose of creating and loading data into an experience matrix, information on previous usage e.g. access of web sites may be acquired e.g. from a user account in a network service. Such service may e.g. collect such information from the user device so that it may be used in creating an experience matrix update.

Predictive browser may have configuration options for using the abstraction metadata. For example, there may be an option to ignore site content during context processing (use of experience matrix) altogether and only use abstraction metadata for the site. As another example, both the abstraction metadata and site content may be used together. As yet another example, one of the above two ways may be emphasized to some degree in context processing, that is, the experience matrix may weight e.g. abstraction metadata more than site content.

The method according to the above description may make it possible to create predictions at a predictive browser which are more meaningful. Also, the task of selecting words from web pages online during context processing may be avoided (it may be difficult to know which ones to select).

Figure 15:
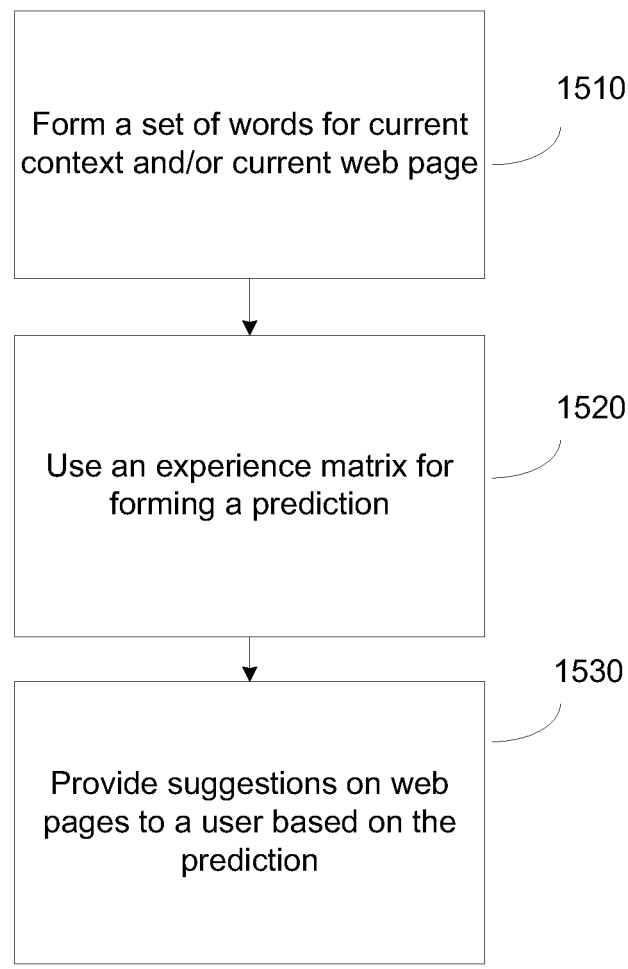
FIG. 15 shows a flow chart of predictive browsing according to an embodiment.

FIG. 15 shows a flow chart of predictive browsing according to an embodiment. In phase 1510, a set of words for use with an experience matrix are formed. The words may be descriptive of a context of a system, such as a current web page, calendar data, location, e-mails and so on. The experience matrix may comprise sparse vectors associated with words, and be formed such that it has data of associations and co-location of words of web pages and context information of the device in the sparse vector coefficients.

In phase 1520, at least a part of at least one sparse vector of the experience matrix is accessed to form a prediction output. This may happen as explained earlier, e.g. locally in a user device or by accessing an experience matrix in a network service In phase 1530, suggestions of web pages may be provided to a user in response to the prediction output. For example, icons/pictures of predicted web pages may be shown to user, or titles of the web pages may be presented. The user may be able to browse the predictions e.g. by touching a touch-screen user interface. Besides touching for showing next predictions to the user, also other modalities can be used such as by saying "next" or hovering forward. The user may be able to directly browse to a web page by clicking or touching an icon of a predicted web page or in another way (such as speech) indicating the page to be accessed.

Figure 16:
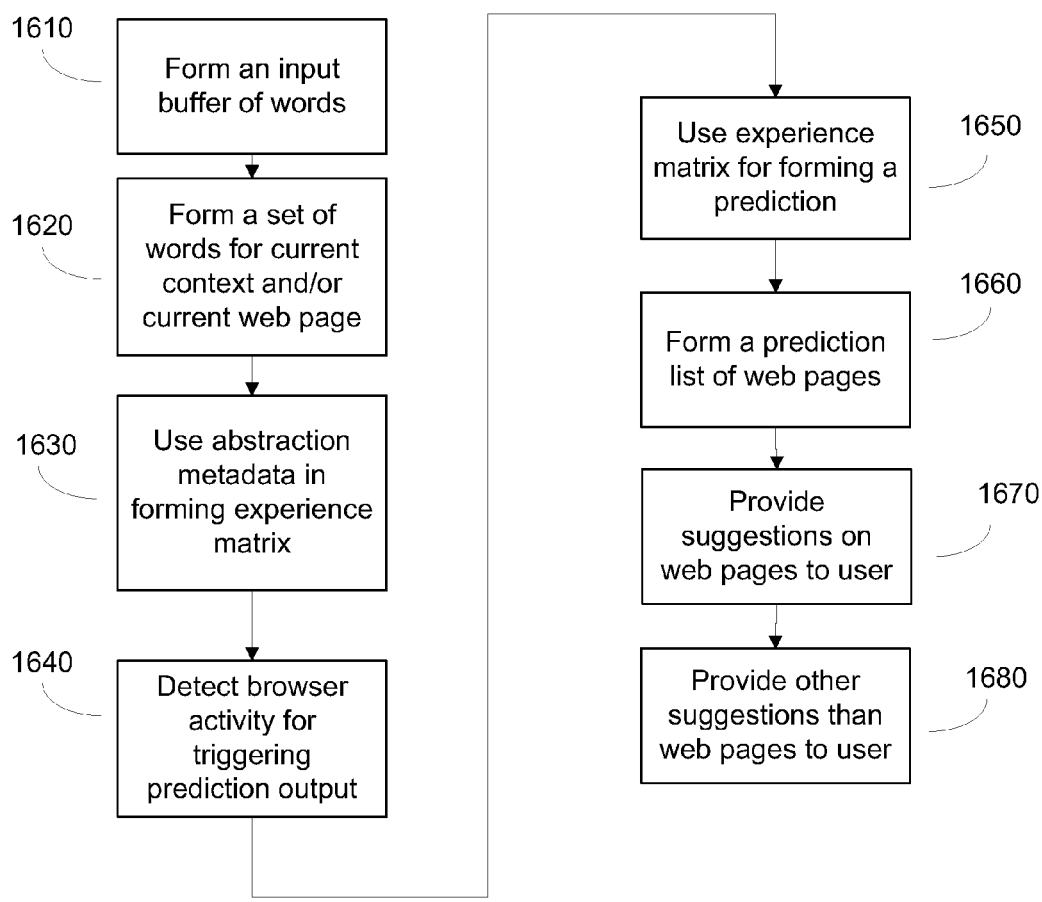
FIG. 16 shows a flow chart of predictive browsing according to an embodiment.

FIG. 16 shows a flow chart of predictive browsing according to an embodiment. In phase 1610, an input buffer for collecting words for updating said experience matrix may be formed. In phase 1620, a set of words for use with an experience matrix are formed, e.g. as an output from an input buffer. The words may be descriptive of a context of a system, such as a current web page, calendar data, location, e-mails and so on. Words may be extended to better capture co-occurrence of similar terms. For example, a sentence "He lives in Espoo" may be extended to "He lives in Espoo location://Finland location://capital-area location://southern-Finland". That is, certain words related to e.g. geographical location, time and other such things may be quantized to better form the connection in the experience matrix between the words. For example, temperatures 41° C. and 42° C. may both be quantized to a word "warm", e.g. in a manner like "temperature://warm".

In phase 1630, abstraction metadata may be used in forming the experience matrix. The experience matrix may be updated based on web browser activity. The experience matrix may comprise sparse vectors associated with words, and be formed such that it has data of associations and co-location of words of web pages and context information of the device in the sparse vector coefficients.

In phase 1640, web browser activity may be detected, and based on the detected activity, a prediction output may be formed. For example, the prediction output may be formed based on a page load completion.

In phase 1650, at least a part of at least one sparse vector of the experience matrix is accessed to form a prediction output. This may happen as explained earlier, e.g. locally in a user device or by accessing an experience matrix in a network service. Abstraction metadata may be used in forming the prediction. The abstraction metadata may be country-specific. The abstraction metadata may be in the form of an experience matrix. Site content and abstraction metadata may be used in a weighted manner in forming the prediction. Forming the prediction output may happen in the background.

In phase 1660, a prediction list comprising images or text of web pages may be formed and/or updated based on web browser activity.

In phase 1670, suggestions of web pages may be provided to a user in response to the prediction output. These predictions or suggestions may also comprise hyperlinks inside a browsed page. For example, icons/pictures of predicted web pages may be shown to user, or titles of the web pages may be presented. The user may be able to directly browse to a web page by clicking or touching an icon of a predicted web page.

In phase 1680, the prediction output may be used to provide suggestions on other related data than web pages.

A user may also be presented with an opportunity to give a rating on how successful the predictions were, for example with a like or dislike button, a slide control or a selection control.

A user may also be shown which words (abstraction metadata words) caused just these predictions of web pages to appear, and words may be edited by user to alter the prediction. For example, a user may be given a chance to remove abstraction words e.g. that he/she does not consider correct, and/or to add words, or change words.

A predictive browser may provide advantages. For example, the browsers presented here may provides better user experience by adapting page suggestions, and faster browsing by eliminating typing in many cases. Preloading of suggested pages may speed up browsing. Using images as page suggestions may be more natural for humans than text. Providing a preloaded experience matrix in or for a browser device may provide a good starting experience, because suggestions may be provided already at first startup. Predictions may be generated in a device, without server interaction over networks, or at a server.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment. A data structure may be formed so that when the data structure is used in a computer with a computer program for controlling the same, the data structure causes the computer program and the computer to operate according to the data structure and the underlying data.

It is obvious that the present invention is not limited solely to the above-presented embodiments, but it can be modified within the scope of the appended claims.

The invention claimed is:

1. A computer-implemented method, comprising:
loading a web page to a web browser, the web browser being executed on at least one device,
receiving system words captured by one or more sensors of the at least one device,
forming a set of words, wherein the set of words comprises words descriptive of content of the webpage and the system words descriptive of a context of the at least one device,
providing the set of words to an experience matrix, wherein the experience matrix comprises sparse vectors associated with the words, and the sparse vectors comprise information on co-occurrences of the words,
loading abstraction metadata as an input in forming the experience matrix, wherein the abstraction metadata comprises words relating to web page contents in an abstract level,
forming a query vector from one or more query words, wherein the one or more query words describe a current situation of the at least one device,
comparing at least a part of at least one sparse vector of the experience matrix and the query vector,
forming a prediction output based on said comparison, and
performing, with at least one processor, predictive browsing services comprising causing to display suggestions to a user of one or more web pages based on said prediction output.

2. A method according to claim 1, comprising:
forming an input buffer for collecting the set of words for updating said experience matrix.

3. A method according to claim 1, comprising:
forming said prediction output based on web browser activity.

4. A method according to claim 1, comprising:
forming said prediction output based on a page load completion.

5. A method according to claim 1, comprising:
forming said prediction output in a background during the user browsing using the web browser.

6. A method according to claim 1, comprising:
updating said experience matrix based on web browser activity.

7. A method according to claim 1, comprising:
forming a prediction list comprising images or text of web pages, and
updating said prediction list based on web browser activity.

8. An apparatus comprising at least one processor, and at least one non-transitory memory including computer program code for one or more program units, the at least one memory and the computer program code configured to, with the processor, cause the apparatus to perform at least the following:
load a web page to a web browser, the web browser being executed on at least one device,
receive system words captured by one or more sensors of the at least one device,
form a set of words, wherein the set of words comprises words descriptive of content of the webpage and the system words descriptive of a context of the at least one device,
provide the set of words to an experience matrix, wherein the experience matrix comprises sparse vectors associated with the words, and the sparse vectors comprise information on co-occurrences of the words,
load abstraction metadata as an input in forming the experience matrix, wherein the abstraction metadata comprises words relating to web page contents in an abstract level,
form a query vector from one or more query words, wherein the one or more query words describe a current situation of the at least one device,
compare at least a part of at least one sparse vector of the experience matrix and the query vector,
form a prediction output based on said comparison, and
perform predictive browsing services comprising causing to display suggestions to a user of one or more web pages based on said prediction output.

9. An apparatus according to claim 8, further comprising computer program code configured to, with the at least one processor, cause the apparatus to perform at least the following:
form an input buffer for collecting the set of words for updating said experience matrix.

10. An apparatus according to claim 8, further comprising computer program code configured to, with the at least one processor, cause the apparatus to perform at least the following:
form said prediction output based on web browser activity.

11. An apparatus according to claim 8, further comprising computer program code configured to, with the at least one processor, cause the apparatus to perform at least the following:
form said prediction output based on a page load completion.

12. An apparatus according to claim 8, further comprising computer program code configured to, with the at least one processor, cause the apparatus to perform at least the following:
form said prediction output in a background during the user browsing using the web browser.

13. An apparatus according to claim 8, further comprising computer program code configured to, with the at least one processor, cause the apparatus to perform at least the following:
update said experience matrix based on web browser activity.

14. An apparatus according to claim 8, further comprising computer program code configured to, with the at least one processor, cause the apparatus to perform at least the following:
   form a prediction list comprising images or text of web pages, and
   update said prediction list based on web browser activity.

15. A computer program product comprising at least one non-transitory memory having program instructions stored thereon which, when executed by an apparatus, causes the apparatus to perform at least the following:
   load a web page to a web browser, the web browser being executed on a at least one device,
   receive system words captured by one or more sensors of the at least one device,
   form a set of words, wherein the set of words comprises words descriptive of content of the webpage and the system words descriptive of a context of the at least one device,
   provide the set of words to an experience matrix, wherein the experience matrix comprises sparse vectors associated with the words, and the sparse vectors comprise information on co-occurrences of the words,
   load abstraction metadata as an input in forming the experience matrix, wherein the abstraction metadata comprises words relating to web page contents in an abstract level,
   form a query vector from one or more query words, wherein the one or more query words describe a current situation of the at least one device,
   compare at least a part of at least one sparse vector of the experience matrix and the query vector,
   form a prediction output based on said comparison, and
   perform predictive browsing services comprising causing to display suggestions to a user of one or more web pages based on said prediction output.

16. A computer program product according to claim 15, wherein the computer-executable program code portion further comprise program code instructions configured to:
   form an input buffer for collecting the set of words for updating said experience matrix.

17. A computer program product according to claim 15, wherein the computer-executable program code portion further comprise program code instructions configured to:
   form said prediction output based on web browser activity.

18. A computer program product according to claim 15, wherein the computer-executable program code portion further comprise program code instructions configured to:
   form said prediction output based on a page load completion.

19. A computer program product according to claim 15, wherein the computer-executable program code portion further comprise program code instructions configured to:
   form said prediction output in a background during the user browsing using the web browser.

20. A computer program product according to claim 15, wherein the computer-executable program code portion further comprise program code instructions configured to:
   update said experience matrix based on web browser activity.

* * * * *